(12) United States Patent
Yoon et al.

(10) Patent No.: US 10,948,947 B2
(45) Date of Patent: Mar. 16, 2021

(54) DISPLAY APPARATUS

(71) Applicant: SAMSUNG DISPLAY CO., LTD., Yongin-Si (KR)

(72) Inventors: Hyoyul Yoon, Seoul (KR); Kyoungah Lee, Seoul (KR); Mingu Kim, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/670,959

(22) Filed: Oct. 31, 2019

(65) Prior Publication Data

US 2020/0142447 A1  May 7, 2020

(30) Foreign Application Priority Data

Nov. 2, 2018 (KR) .......................... 10-2018-0133835

(51) Int. Cl.
*G06F 1/16* (2006.01)

(52) U.S. Cl.
CPC .......... *G06F 1/1652* (2013.01); *G06F 1/1643* (2013.01); *G06F 1/1681* (2013.01)

(58) Field of Classification Search
CPC combination set(s) only.
See application file for complete search history.

(56) References Cited

U.S. PATENT DOCUMENTS

| | | |
|---|---|---|
| 9,119,316 B2 | 8/2015 | Lee |
| 9,317,067 B2 | 4/2016 | Choi et al. |
| 9,348,362 B2 | 5/2016 | Ko et al. |
| 9,612,621 B2 | 4/2017 | Lee et al. |
| 9,786,207 B2 | 10/2017 | Kim et al. |
| 9,980,373 B2 | 5/2018 | Jeong et al. |
| 10,043,421 B2 | 8/2018 | Koo et al. |
| 2018/0217639 A1* | 8/2018 | Jones ............... H05K 1/028 |

FOREIGN PATENT DOCUMENTS

| | | |
|---|---|---|
| KR | 10-2014-0014669 A | 2/2014 |
| KR | 10-2014-0099133 A | 8/2014 |
| KR | 10-2014-0101274 A | 8/2014 |
| KR | 10-2015-0060161 A | 6/2015 |
| KR | 10-2016-0090471 A | 8/2016 |
| KR | 10-2016-0120399 A | 10/2016 |
| KR | 10-2017-0026023 A | 3/2017 |

* cited by examiner

*Primary Examiner* — Deeprose Subedi
(74) *Attorney, Agent, or Firm* — Lewis Roca Rothgerber Christie LLP

(57) ABSTRACT

A display apparatus includes a display module and a support member disposed below the display module and supporting the display module. The display module includes a folding region and a plurality of non-folding regions adjacent to the folding region, and having a display surface for displaying an image. The display module is operated in a plurality of modes, and the plurality of modes includes a first mode in which the folding region has a first curvature radius and is folded in a first bending direction which surrounds a virtual first bending axis defined below the display module and a second mode in which the folding region has a second curvature radius and is folded in a second bending direction which surrounds a virtual second bending axis defined above the display module. The first curvature radius is greater than the second curvature radius.

19 Claims, 19 Drawing Sheets

DISPLAY APPARATUS

CROSS-REFERENCE TO RELATED APPLICATION

This application claims priority to and the benefit of Korean Patent Application No. 10-2018-0133835, filed on Nov. 2, 2018, in the Korean Intellectual Property Office (KIPO), the entire content of which is hereby incorporated by reference.

BACKGROUND

1. Field

The present disclosure herein relates to a display apparatus, and more particularly, to a foldable display apparatus capable of bidirectional folding.

2. Discussion of Related Art

A display apparatus displays various images on a display screen to provide information to a user. Recently, a display apparatus (with a flexible display member which is bendable) capable of folding or rolling has been developed. A flexible display apparatus can be folded, rolled, or bent like paper, unlike a flat panel display apparatus. A flexible display apparatus, whose shape can be changed in various ways, is easy to carry and can improve user convenience.

SUMMARY

An aspect according to embodiments of the present disclosure is directed toward a display apparatus with improved convenience and portability.

According to an embodiment of the inventive concept, a display apparatus includes a display module including a folding region and a plurality of non-folding regions adjacent to the folding region, and having a display surface to display an image; and a support member below the display module to support the display module, wherein the display module is configured to operate in a plurality of modes, and the plurality of modes includes an unfolding mode in which an entire display module is unfolded to have a flat-plate shape, a first mode in which the folding region has a first radius of curvature and is folded in a first bending direction around a first bending axis below the display module and a second mode in which the folding region has a second radius of curvature and is folded in a second bending direction around a second bending axis above the display module, wherein the first bending axis is substantially parallel to the second bending axis, and the first radius of curvature is greater than the second radius of curvature.

In an embodiment, the folding region may include a first region configured to be folded in the first bending direction in the first mode and to be folded in the second bending direction in the second mode, and a second region adjacent to the first region, and configured to be folded in the first bending direction in the first mode and to be unfolded to have a flat-plate shape in the second mode.

In an embodiment, the first region may be at a center of the folding region on a first plane, and the second region may include a plurality of second regions and adjacent to both sides of the first region in a first direction.

In an embodiment, the support member may include a plurality of support plates overlapping with the non-folding regions on the first plane and a folding unit overlapping with the folding region on the first plane and configured to be folded or unfolded according to an operation of the folding region, wherein the folding unit extends parallel to the first bending axis, and includes a plurality of joints connected to each other.

In an embodiment, the folding unit may include a first side and a second side facing oppositely away from the first side, the plurality of joints may include a plurality of central joints connected to each other, the plurality of central joints forming an array, the array including a first side and a second side facing oppositely away from the first side, and a plurality of edge joints on at least the first and second sides of the folding unit and connecting the central joints on the first and second sides of the array to the support plates in a one-to-one correspondence.

In an embodiment, one or more corresponding edge joints of the edge joints may be between a corresponding one of the first and second sides of the array of central joints and a corresponding support plate.

In an embodiment, an upper surface of each of the plurality of joints may define a support surface to support the display module, and an area of the upper surface of each of the plurality of joints may be larger than an area of a bottom surface of each of the plurality of joints, and a maximum value of a separation distance between the joints may be decreased in the first mode relative to the unfolding mode, and the maximum value of the separation distance between the joints may be increased in the second mode relative to the unfolding mode.

In an embodiment, a maximum value of a separation distance between adjacent joints in the first mode may be less than the maximum value of the separation distance between adjacent joints in the second mode, and a maximum distance between the edge joint and the support plate in the second mode may be less than a maximum value of a separation distance between adjacent central joints.

In an embodiment, a maximum value of a separation distance between adjacent central joints in the unfolding mode may have a first distance, the maximum value of the separation distance between adjacent central joints in the first mode may have a second distance smaller than the first distance, and the maximum value of the separation distance between adjacent central joints in the second mode may have a third distance greater than the first distance.

In an embodiment, a separation distance between the edge joint and the support plate in the first mode may be less than or equal to the first distance, and the separation distance between the edge joint and the support plate in the second mode may be less than the third distance and greater than or equal to the first distance.

In an embodiment, the folding unit may further include a plurality of connection members to connect adjacent joints, wherein the plurality of connection members may include inner connection members adjacent to the upper surfaces of the joints and connecting upper portions of adjacent joints and outer connection members adjacent to the bottom surfaces of the joints and connecting lower portions of adjacent joints, wherein the outer connection members may include first outer connection members to connect adjacent central joints, and second outer connection members to connect the support plates and the edge joints.

In an embodiment, a length of each of the second outer connections member may be less than a length of each of the first outer connection members.

In an embodiment, each of the plurality of joints may further include a guide rail on at least one surface thereof, each of the outer connection members may include a first side and a second side facing oppositely away from the first side, and the separation distance between the joints is configured to be varied by movement of at least one of the first and second sides of each of the outer connection members along the guide rail.

In an embodiment, the guide rail may include first guide rails on the central joints and each of the first guide rails connected to at least one side of the first outer connection member, and second guide rails on the edge joints and each of the second guide rails connected to at least one side of the second outer connection member, wherein a length of each of the second guide rails is less than a length of each of the first guide rails.

In an embodiment, an elastic modulus of each of the first outer connection members may be lower than an elastic modulus of each of the second outer connection members.

In an embodiment, each of the outer connection members may include a spring.

In an embodiment, each of the connection members may include a hinge to rotate the joints, and connection bars to connect the joints to the hinge in a one-to-one correspondence and rotating around the hinge, wherein an angle range in which the edge joints rotate is less than an angle range in which each of the central joints rotate.

In an embodiment, the display surface may include first and second display surfaces not overlapping with the folding region and separated from each other, the support plates may include first and second bottom surfaces facing each other in the second mode, and a distance between the first and second display surfaces in the first mode is the same as a distance between the first and second bottom surfaces of the support plates in the second mode.

In an embodiment of the inventive concept, a display apparatus includes a display module to display an image, and a support member below the display module, wherein the display module and the support member are configured to be folded in a plurality of modes, and the plurality of modes includes a first mode in which the display module is folded in a direction around a first bending axis below the display module, and a second mode in which the display module is folded in a direction around a second bending axis above the display module, wherein a region in which the display module and the support member are substantially folded has a first area in the first mode and a second area less than the first area in the second mode.

In an embodiment of the inventive concept, a display apparatus includes a display module including a folding region and a non-folding region adjacent to the folding region, the folding region including a central region and a peripheral region, and a support member below the display module and including a folding unit and a plurality of joints overlapping with the folding region, wherein the folding region of the display module and the folding unit of the support member are configured to be folded in a plurality of modes, and the plurality of modes includes a first mode in which the central region and the peripheral region are folded, and a second mode in which the central region is folded and the peripheral region is unfolded.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
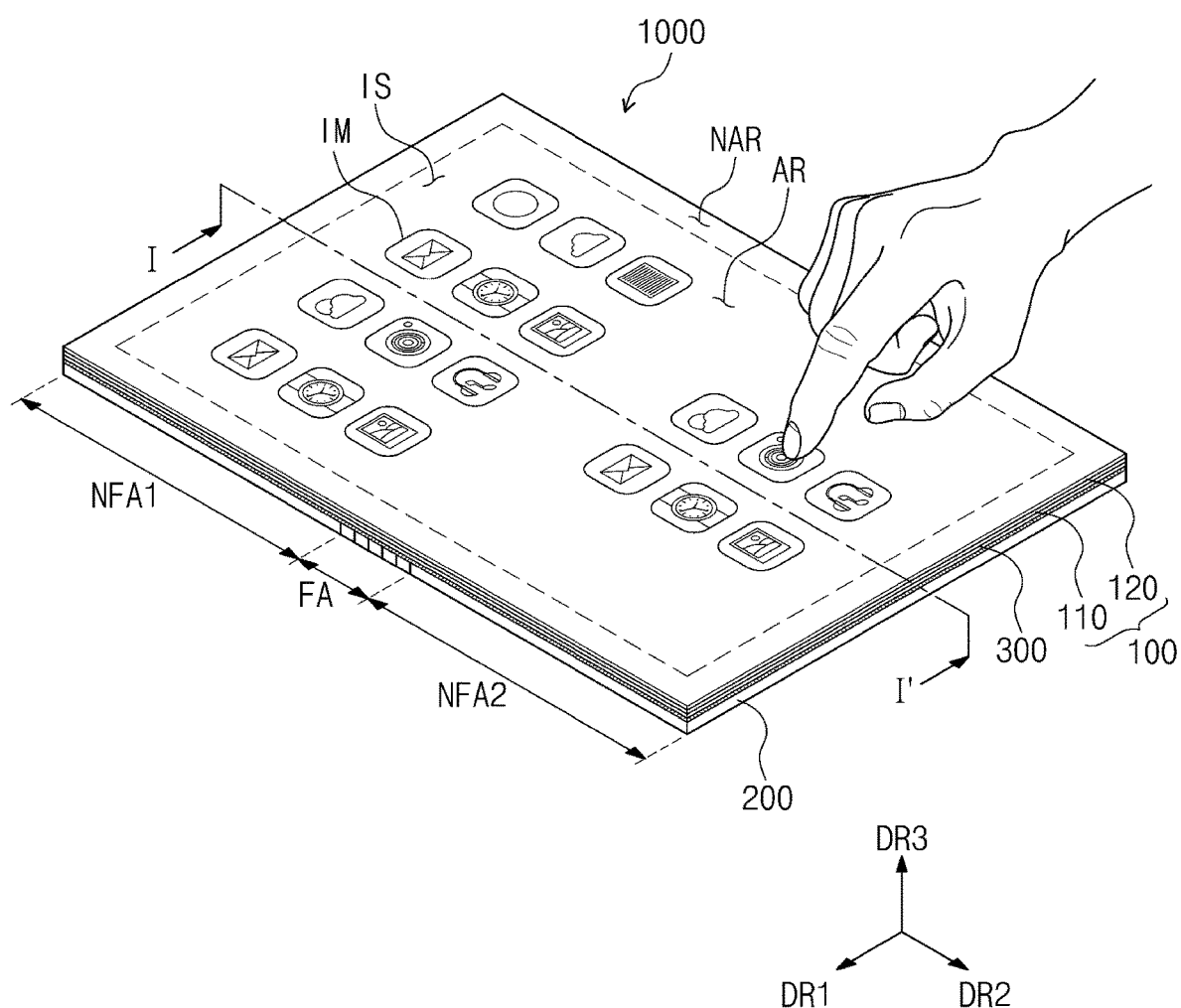
FIG. 1 is a perspective view of a display apparatus according to an embodiment of the inventive concept.

In the present disclosure, when an element (or a region, a layer, a portion, etc.) is referred to as being "on," "connected to," or "coupled to" another element, it refers to that the element may be directly disposed on, connected to, or coupled to the other element, or that a third element may be disposed therebetween.

Like reference numerals refer to like elements. Also, in the drawings, the thickness, the ratio, and the dimensions of elements are exaggerated for an effective description of technical contents.

The term "and/or," includes all combinations of one or more of which associated configurations may define.

It will be understood that, although the terms "first", "second", etc., may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

Hereinafter, exemplary embodiments of the inventive concept will be described with reference to the accompanying drawings.

Figure 2:
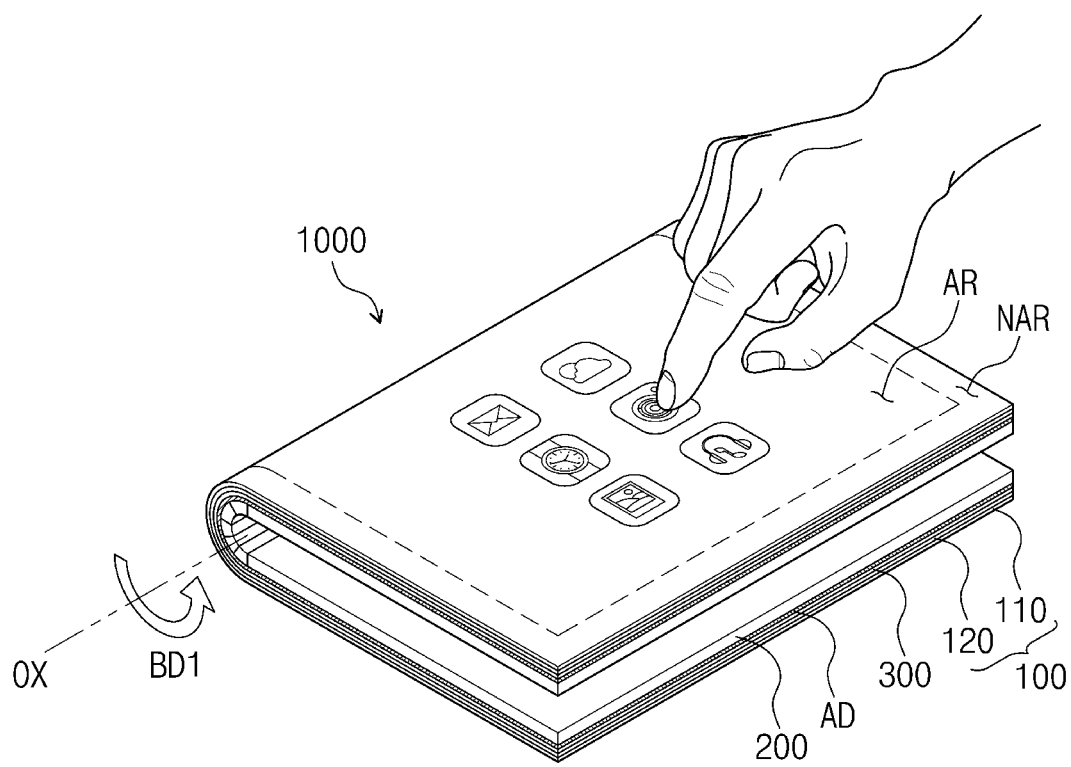
FIG. 2 is a view showing a state in which the display apparatus shown in FIG. 1 is out-folded.

FIG. 1 is a perspective view of a display apparatus according to an embodiment of the inventive concept. FIG. 2 is a view showing a state in which the display apparatus shown in FIG. 1 is out-folded, and FIG. 3 is a view showing a state in which the display apparatus shown in FIG. 1 is in-folded.

Figure 3:
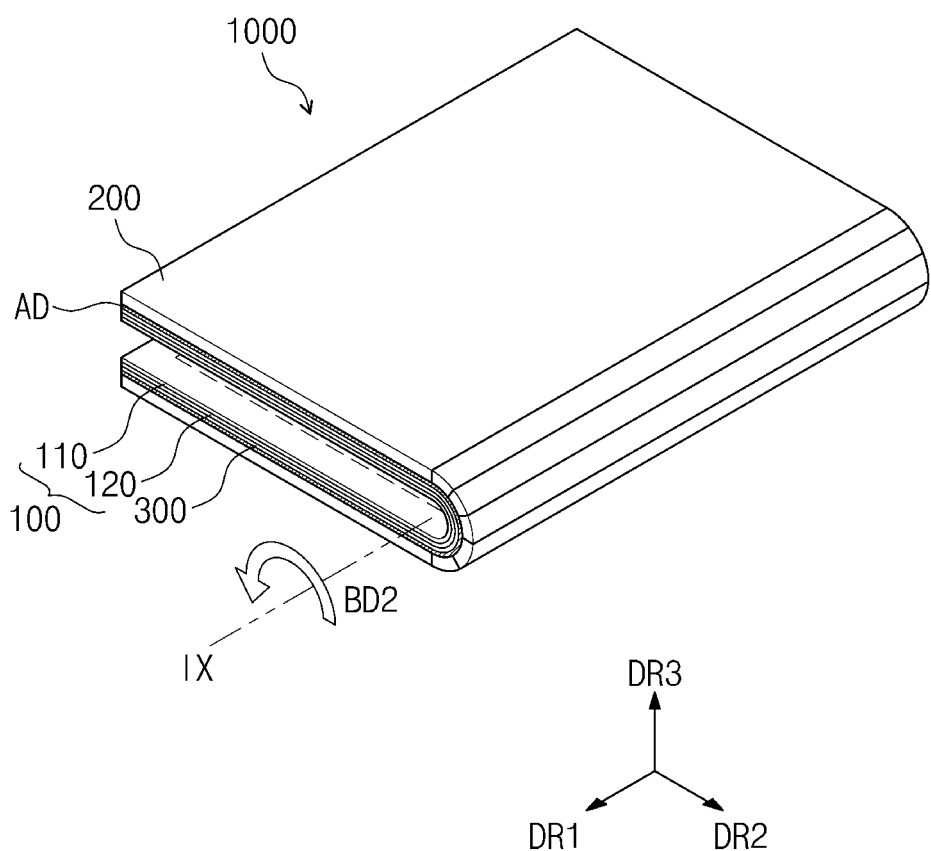
FIG. 3 is a view showing a state in which the display apparatus shown in FIG. 1 is in-folded.

Referring to FIGS. 1-3, on a plane, a display apparatus 1000 has a shape of a rectangle which has a short side in a first direction DR1 and a long side in a second direction DR2 which crosses the first direction DR1. However, the shape of the display apparatus 1000 is specified (e.g., described) as an example for convenience of explanation, and the inventive concept is not particularly limited to the shape of the display apparatus 1000.

The display apparatus 1000 may display an image IM through a display surface IS. In a state in which the display apparatus 1000 is unfolded, the display surface IS is parallel to a surface defined by the first direction DR1 and the second direction DR2. The normal direction of the display surface IS, that is, the thickness direction of the display apparatus 1000, is indicated by a third direction DR3.

In a state in which the display apparatus 1000 is unfolded, the front surface (or upper surface) or the rear surface (or lower surface) of each member or unit described below is defined by the third direction DR3. However, the first to third directions DR1, DR2, and DR3 are a relative concept, and may be converted to different directions.

The display apparatus 1000 according to an embodiment of the inventive concept may be a flexible display device 1000. For example, the display apparatus 1000 according to an embodiment of the inventive concept may be folded or unfolded based on at least one of the folding axes OX and IX, each extending in a set or predetermined direction. That is, the display apparatus 1000 according to an embodiment of the inventive concept may be a foldable display device 1000. In an embodiment of the inventive concept, the folding axis OX and IS each extend in the first direction DR1.

The display apparatus 1000 may be divided into a plurality of regions according to a folding motion. For example, the display apparatus 1000 may be divided into a folding region FA and at least one of the non-folding regions NFA1 and NFA2 arranged on a plane (e.g., a plane defined by the first direction DR1 and second direction DR2).

The folding region FA is a region where folding stress according to folding is applied. The folding region FA overlaps with the folding axes OX and IX. In the embodiment, one (e.g., a single) folding region FA is defined in the display apparatus 1000. However, the inventive concept is not limited to the number of the folding region FA.

In the non-folding regions NFA1 and NFA2, the display apparatus 1000 is not folded. In the embodiment, the non-folding regions NFA1 and NFA2 may be provided in plurality. For example, the non-folding regions NFA1 and NFA2 may include a first non-folding region NFA1 and a second non-folding region NFA2. The first non-folding region NFA1 is defined (e.g., illustrated) on one side of the display apparatus 1000 in the second direction DR2, and the second non-folding region NFA2 is defined (e.g., illustrated) on the other side of the display apparatus 1000 in the second direction DR2. The folding region FA is defined (e.g., illustrated) between the first non-folding region NFA1 and the second non-folding region NFA2 on a plane (e.g., a plane defined by the first direction DR1 and second direction DR2).

The display apparatus 1000 according to an embodiment of the inventive concept may operate in a plurality of modes. For example, as shown in FIG. 1, the display apparatus 1000 may operate in an unfolding mode, unfolded to have a flat-plate shape.

In addition, the display apparatus 1000 according to an embodiment of the inventive concept may be folded in both directions (e.g., in two opposing directions). For example, as shown in FIG. 2, the display apparatus 1000 may be out-folded on the basis of a first folding axis OX defined below the display apparatus 1000. The direction in which the display apparatus 1000 is out-folded is defined as a first bending direction BD1. In this case, because the display surface IS is exposed to the outside, the display apparatus 1000 may display the image IM even in the folded state.

In addition, as shown in FIG. 3, the display apparatus 1000 may be in-folded on the basis of a second folding axis IX defined above the display apparatus 1000. In this case, the display surface IS is not exposed to the outside. The direction in which the display apparatus 1000 is in-folded is defined as a second bending direction BD2. The second bending direction BD2 may be opposite to the first bending direction BD1. As an example, when the first bending direction BD1 is a counterclockwise direction, the second bending direction BD2 may be a clockwise direction.

Hereinafter, for convenience of explanation, the state in which the display apparatus 1000 is out-folded is defined as a first mode, and the state in which the display apparatus 1000 is in-folded is defined as a second mode.

Figure 4:
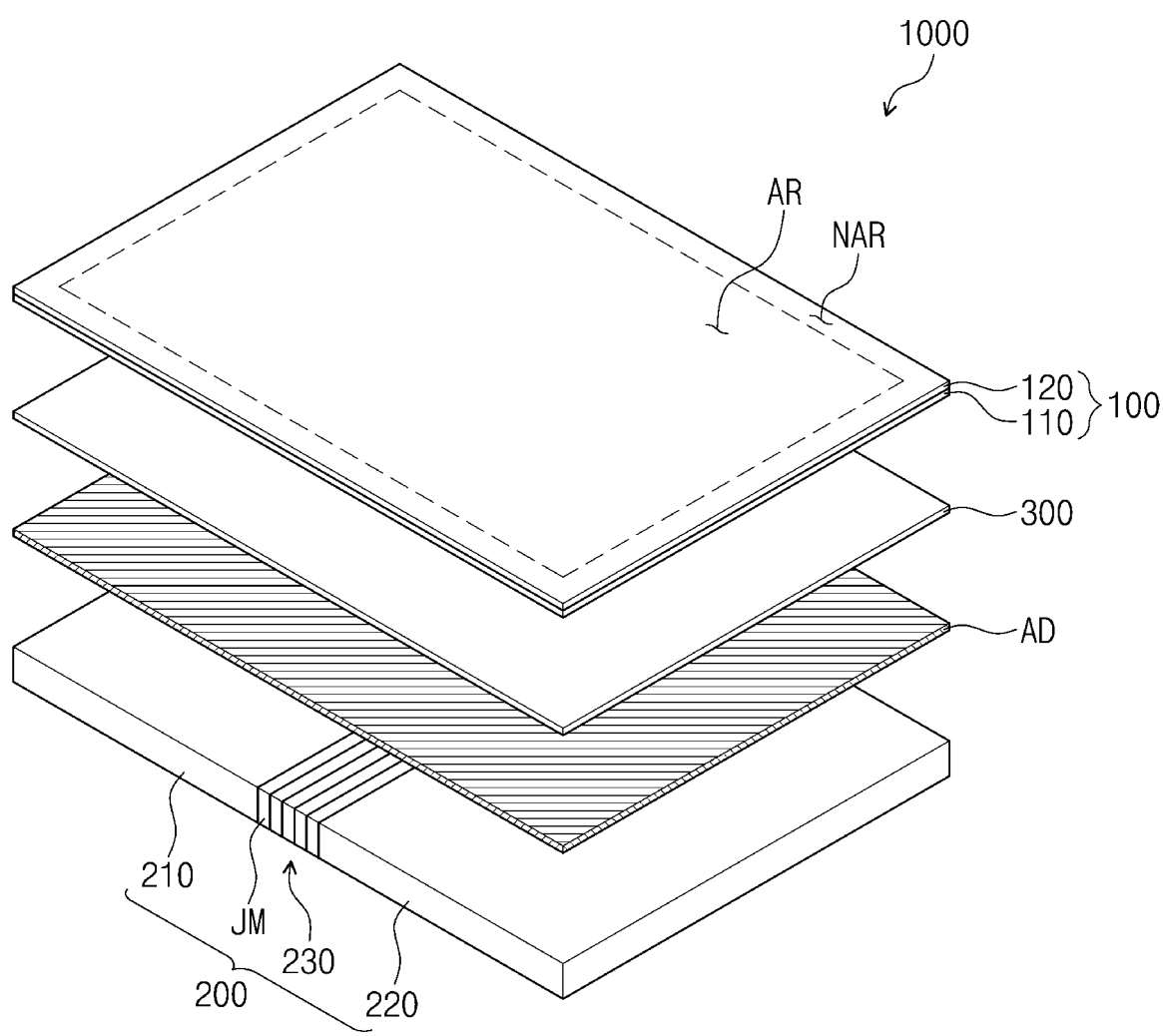
FIG. 4 is an exploded perspective view of the display apparatus shown in FIG. 1.
Figure 4:
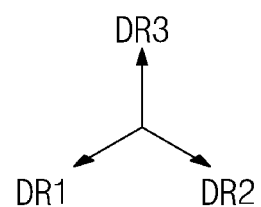
Figure 5:
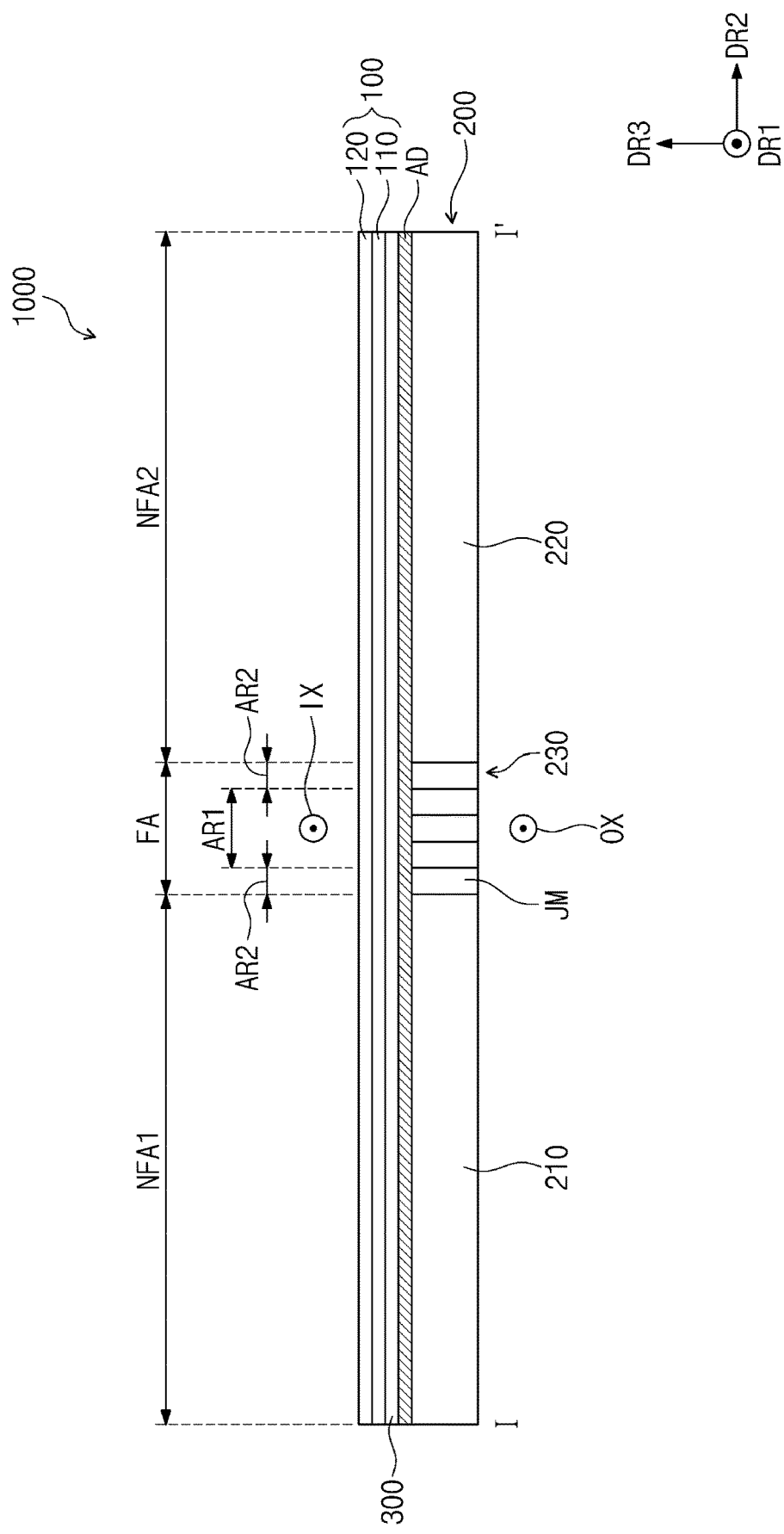
FIG. 5 is a sectional view taken along the line I-I' shown in FIG. 1.

FIG. 4 is an exploded perspective view of the display apparatus shown in FIG. 1 and FIG. 5 is a sectional view taken along the line I-I' shown in FIG. 1.

Referring to FIG. 4 and FIG. 5, the display apparatus 1000 includes a display module 100 and a support member 200.

The display module 100 may be divided into an active region AR and a peripheral region NAR on a plane defined by the first direction DR1 and the second direction DR2. The active region AR is defined (e.g., illustrated) in the center portion of the display module on a plane. The peripheral region NAR is adjacent to the active region AR. The peripheral region NAR may surround the active region AR. In the embodiment, the peripheral region NAR is defined (e.g., illustrated) as a frame shape surrounding the active region AR.

The display module 100 includes a display member 110 and an input sensing member 120.

The display member 110 may be a base layer on which the input sensing member is disposed. As an example, the display member 110 may include an insulation substrate or an insulation film. The display member 110 displays the image IM (see FIG. 1) on the active region AR.

The support member 200 is disposed below the display module 100 and supports the display module 100. The strength of the support member 200 may be greater than the strength of the display module 100. As an example, the support member 200 may include a metal material.

The support member 200 includes a folding unit 230 and at least one of the support plates 210 and 220. The support plates 210 and 220 overlap with the non-folding region NFA. In the embodiment, the support plates 210 and 220 may be provided in plurality and disposed to overlap with the two non-folding regions NFA in a one-to-one correspondence. For example, the plurality of support plates 210 and 220 may include a first plate 210 and a second plate 220. The first plate 210 is disposed adjacent to one side of the folding unit 230. The first plate 210 overlaps with the first non-folding region NFA1. The second plate 220 is disposed adjacent to the other side of the folding unit 230. The second plate 220 overlaps with the second non-folding region NFA2. The first plate 210, the folding unit 230, and the second plate 220 are connected to each other.

The folding unit 230 overlaps with the folding region FA. On a plane, the area of the folding unit 230 corresponds to the area of the folding region FA. The folding unit 230 includes a plurality of joints JM. Each of the joints JM has a bar shape extending in the first direction DR1. Each of the joints JM is connected to adjacent joints JM and arranged in the second direction DR2. A specific shape of the folding unit 230 will be described in more detail below with reference to FIG. 8-FIG. 11.

The display apparatus 1000 according to an embodiment of the inventive concept may further include a protection member 300. The protection member 300 is disposed between the display module 100 and the support member 200. In the embodiment, the protection member 300 has a sheet shape. When the display apparatus 1000 is folded, the protection member 300 prevents or substantially prevents the display module 100 from being damaged due to the folding unit 230 of the support member 200, and absorbs shock which may be transferred to the display module 100. As an example, the protection member 300 may have elasticity. In another embodiment of the inventive concept, the protection member 300 may be omitted (e.g., may not be included).

The display apparatus 1000 according to an embodiment of the inventive concept may further include an adhesive member AD disposed either between the protection member 300 and the support member 200 or between the protection member 300 and the display module 100.

Figure 6:
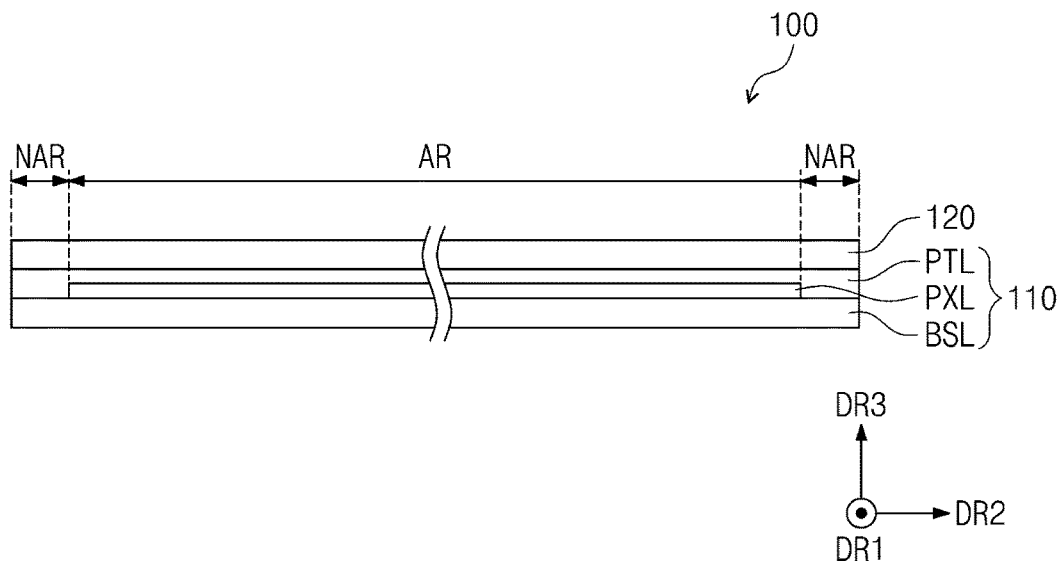
FIG. 6 is an enlarged cross-sectional view of the display module shown in FIG. 5.

FIG. 6 is an enlarged cross-sectional view of the display module shown in FIG. 5.

Referring to FIG. 6, the display member 110 includes a base layer BSL, a pixel layer PXL, and a protection layer PTL. The base layer BSL defines the rear surface of the display module 100. The base layer BSL may be made of a flexible material.

The pixel layer PXL is disposed on the base layer BSL. The pixel layer PXL includes a plurality of pixels. The pixels receive an electrical signal to implement (e.g., to display) the image IM. The pixel layer PXL overlaps with the active region AR on a plane.

According to an embodiment of the inventive concept, according to the configuration of the pixel layer PXL, the type of the display member 110 may be determined. The display member 110 may be a liquid crystal display panel, an organic light emitting display panel, an electrophoretic display panel, an electro-wetting display panel, or may be one of various suitable display panels capable of displaying images. In addition, the display member 110 of the inventive concept may include various embodiments, and is not limited to any one thereof.

Figure 7:
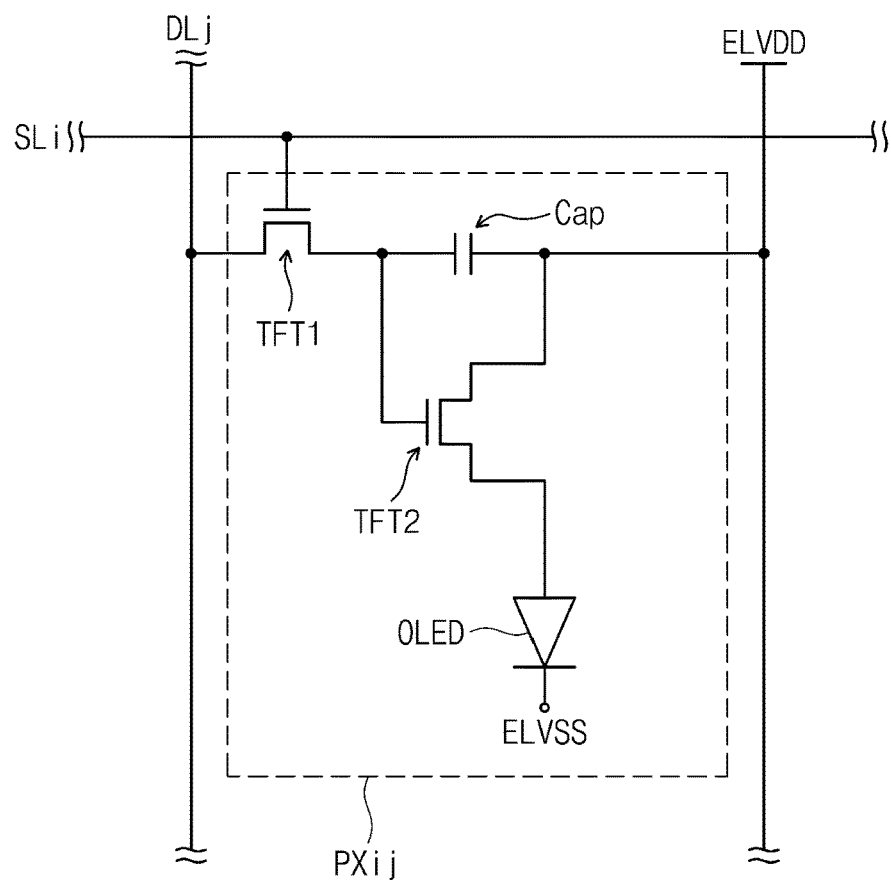
FIG. 7 is an equivalent circuit diagram showing one pixel of a display apparatus according to an embodiment of the inventive concept.

FIG. 7 is an equivalent circuit diagram showing one pixel of a display apparatus according to an embodiment of the inventive concept.

Referring to FIG. 7, the display member 110 may be an organic light emitting display panel. Accordingly, one pixel PXij includes at least one thin film transistor, at least one capacitor, and at least one display device. In the embodiment, the pixel PXij includes a first thin film transistor TFT1, a second thin film transistor TFT2, one capacitor Cap, and an organic light emitting device OLED.

The first thin film transistor TFT1 includes a control electrode connected to the $i^{th}$ scan line SLi, an input electrode connected to the $j^{th}$ data line DLj, and an output electrode. The first thin film transistor TFT1 outputs a data signal applied to the $j^{th}$ data line DLj in response to a scan signal applied to the $i^{th}$ scan line SLi.

The capacitor Cap includes a first capacitor electrode connected to the first thin film transistor TFT1 and a second capacitor electrode receiving a first power voltage ELVDD. The capacitor Cap charges the amount of charge corresponding to the difference between the voltage corresponding to the data signal received from the first thin film transistor TFT1 and the first power voltage ELVDD.

The second thin film transistor TFT2 includes a control electrode connected to the output electrode of the first thin film transistor TFT1 and the first capacitor electrode of the capacitor Cap, an input electrode for receiving the first power voltage ELVDD, and an output electrode. The output electrode of the second thin film transistor TFT2 is connected to the organic light emitting device OLED.

The second thin film transistor TFT2 controls a driving current flowing in the organic light emitting device OLED in accordance with the amount of charge stored in the capacitor Cap. The turn-on time of the second thin film transistor TFT2 is determined according to the amount of charge charged in the capacitor Cap. Substantially, the output electrode of the second thin film transistor TFT2 supplies a voltage lower than the first power voltage ELVDD to the organic light emitting device OLED.

The organic light emitting device OLED includes a first electrode connected to the second thin film transistor TFT2 and a second electrode receiving a second power voltage ELVSS. The organic light emitting device OLED may include a light emitting pattern disposed between the first electrode and the second electrode.

The organic light emitting device OLED emits light during the turn-on period of the second thin film transistor TFT2. The color of light generated in the organic light emitting device OLED is determined by a material forming the light emitting pattern. For example, the color of the light generated in the organic light emitting device OLED may be any one of red, green, blue, and white.

The protection layer PTL is disposed on the pixel layer PXL and covers the pixel layer PXL. The protection layer PTL electrically insulates the pixel layer PXL and the input sensing member 120.

For example, the protection layer PTL may be an encapsulation layer for encapsulating the pixel layer PXL. Here, the protection layer PTL may include a plurality of organic films and/or inorganic films laminated (over one another).

In addition, the protection layer PTL may be a planarization layer for planarizing an upper surface of the pixel layer PXL. The protection layer PTL according to an embodiment of the inventive concept may be provided in various suitable forms, and is not limited to any one embodiment.

The input sensing member 120 is disposed on the protection layer PTL. The active region AR of the input sensing member 120 may substantially overlap with the region in which the pixel layer PXL is disposed.

The input sensing member 120 senses an external input provided to the active region AR of the display module 100.

The external input may be provided in various suitable manners. FIG. 1 and FIG. 2 show embodiments for sensing external inputs that are input (e.g., provided) through a body part (for example, a finger) of a user. However, this is only exemplary, and the external input provided to the input sensing member 120 is not limited to any one method. According to another embodiment of the inventive concept, the external input may be input (e.g., provided) in a manner such as through optical, touch, or magnetic methods.

In one or more embodiments, the input sensing member 120 may include an input sensing cell including a plurality of input sensing sensors for sensing an external input, and driving wires and pads for transferring an electrical signal generated by the input sensing cell to the outside. The pad may be connected to the display member 110 or connected to an external power supply device.

The input sensing member may sense an external input in various suitable manners. As an example, the input sensing member 120 may be driven by an electrostatic capacitance method, a resistive film method, a coordinate recognition method, and/or the like.

Figure 8:
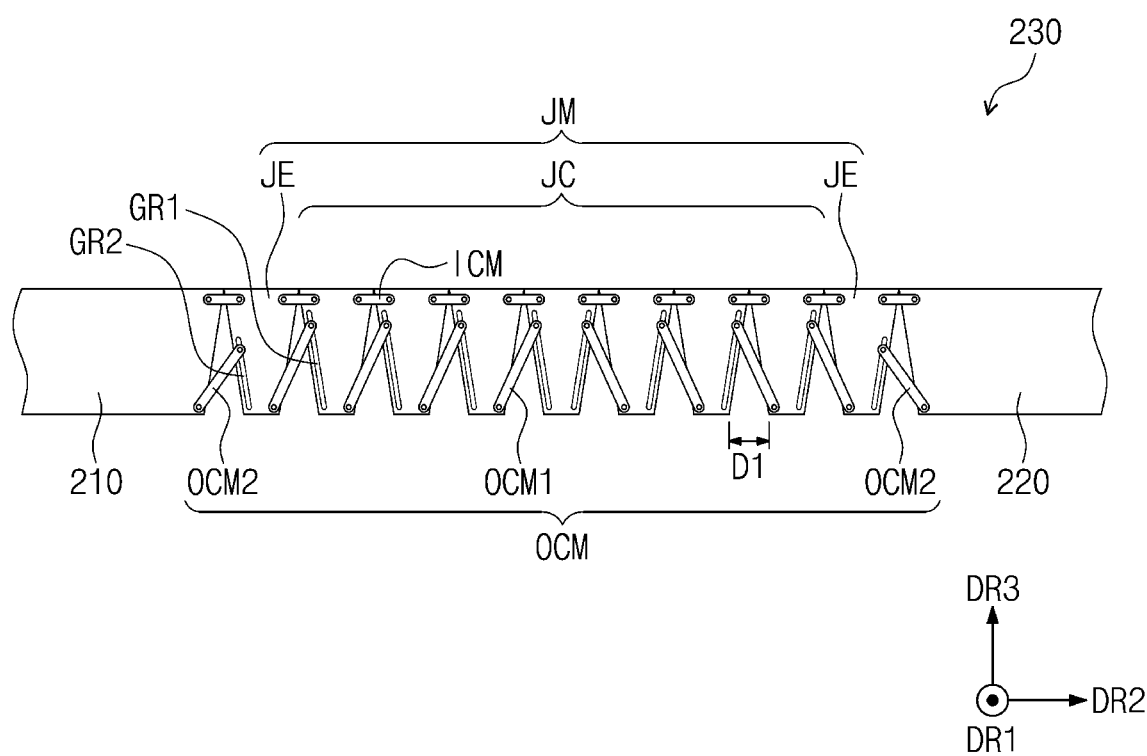
FIG. 8 is an enlarged cross-sectional view of the folding unit shown in FIG. 5.
Figure 9:
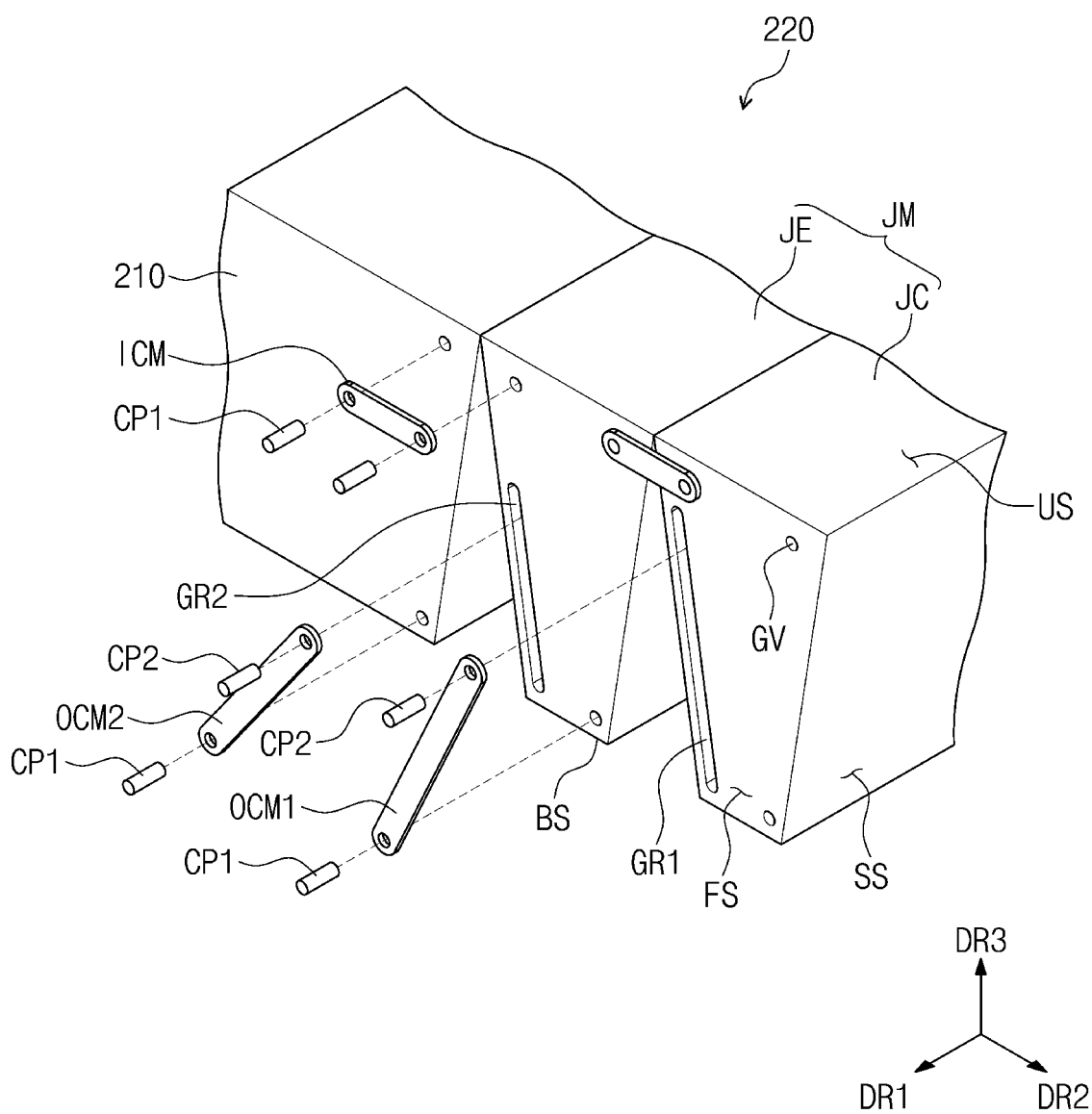
FIG. 9 is an exploded perspective view of the joints and connection members shown in FIG. 8.

FIG. 8 is an enlarged cross-sectional view of the folding unit shown in FIG. 5, and FIG. 9 is an exploded perspective view of the joints and connection members shown in FIG. 8.

The folding unit 230 according to an embodiment of the inventive concept includes the plurality of joints JM. Each of the joints JM has a bar shape extending along the first direction DR1.

The cross-sectional shape of each of the joints JM may have an inverted trapezoidal shape. For example, each of the joints JM may include an upper surface US, a bottom surface BS, and a plurality of side surfaces SS and FS. The upper surface US supports the display module 100. That is, upper surfaces of the joints JM define a support surface for supporting the display module 100.

The bottom surface BS faces the upper surface US. In the embodiment, the area (e.g., surface area) of the upper surface US may be greater than the area (e.g., surface area) of the bottom surface BS.

The side surfaces SS and FS connect the upper surface US and the bottom surface BS. From among the side surfaces SS and FS of each of the joints JM, each of the side surfaces SS facing the adjacent joints JM may include an inclined surface. As shown in FIG. 8, when the display apparatus 1000 is in the unfolding mode, the maximum value of the separation distance between the side surfaces FS of the joints JM facing each other may be defined as a first distance D1.

The joints JM include central joints JC and edge joints JE. The central joints JC are connected to each other and arranged in the second direction DR2. One or more of corresponding edge joints of the edge joints JE are between a corresponding one of the first and second sides of an array formed by the central joints JC and a corresponding support plate in a one-to-one correspondence. For example, from among the edge joints JE, one edge joint JE may be connected to one side of the array formed by the central joints JC and connects the central joint JC disposed on the one side of the array to the first plate 210. From among the edge joints JE, another edge joint JE may be connected to the other side of the array formed by the central joints JC and connects the central joint JC disposed on the other side of the array to the second plate 220.

In the embodiment, one edge joint JE is disposed between the central joint JC and one of the support plates 210 and 220. However, the inventive concept is not limited thereto. In another embodiment of the inventive concept, the edge joint JE may be provided in plurality between the central joint JC and one of the support plates 210 and 220 and arranged in the second direction DR2.

The folding unit 230 according to an embodiment of the inventive concept includes a plurality of connection members ICM and OCM. The connection member ICM and OCM are disposed between the joints JM adjacent to each other, and between the support plates 210 and 220 and an array formed by the joints JM. The connection members ICM and OCM connect the joints JM adjacent to each other, and connect the support plates 210 and 220 and the joints JM adjacent to the support plates 210 and 220.

The connection members ICM and OCM include a plurality of inner connection members ICM and a plurality of outer connection members OCM.

The inner connection members ICM are disposed adjacent to the upper surface US of each of the joints JM supporting the display module 100. In the embodiment, the inner connection members ICM may be disposed in a region adjacent to the upper surface US on each of the side surface FS of the joints JM. The inner connection members ICM connect upper portions of two joints JM adjacent to each other.

For example, the inner connection members ICM may have a bar shape. The two ends of the inner connection member ICM are connected to different joints JM. That is, one inner connection member ICM may connect two joints JM. The folding unit 230 may further include a plurality of connection pins CP1. The connection pins CP1 are disposed on each side of the inner connection members ICM and fix the inner connection members ICM to the corresponding joints JM.

According to the embodiment, grooves GV may be defined on the side surfaces FS of each of the joints JM. The grooves GV have a shape recessed inwardly from each of the side surfaces FS of the joints JM in the first direction DR1. The grooves GV may be formed in edge regions of the side surface FS of each of the joints JM.

Accordingly, one of the connection pins CP1 connected to the inner connection member ICM is inserted into the groove GV of one joint JM, and the other one of the connection pins CP1 connected to the same inner connection member ICM is inserted into the groove GV of the joint JM adjacent to the one joint JM.

The inner connection member ICM is capable of rotating around the connection pin CP1. Accordingly, when the display apparatus 1000 is folded around the folding axes OX and IX (see FIG. 2 and FIG. 3), the joints JM connected to the inner connection member ICM are rotated in a set or predetermined direction such that the folding unit 230 is folded.

At least one side of the outer connection members OCM is disposed adjacent to the bottom surface BS of each of the joints JM. In the embodiment, at least a portion of the outer connection members OCM may be disposed in a region adjacent to the bottom surface BS on each of the side surface FS of the joints JM. The outer connection members OCM connect lower portions of two joints JM adjacent to each other.

For example, the outer connection members OCM may have a bar shape. The two ends of the outer connection member OCM are connected to different joints JM. That is, one outer connection member OCM may connect two joints JM. On one end of the outer connection member OCM, the connection pin CP1 is disposed. The connection pin CP1 fixes the outer connection member ICM to the corresponding joint JM. The connection pin CP1 is inserted into the groove GV of the joint JM.

The folding unit 230 may further include a plurality of movement pins CP2. The movement pin CP2 is disposed on the other end of the outer connection member OCM.

According to the embodiment, guide rails GR1 and GR2 may be defined on the side surfaces FS of each of the joints JM. The guide rails GR1 and GR2 have a shape extending in an upward direction (on the side surface FS of each of the joints JM) along an adjacent edge at which the side surfaces FS and SS of the joints JM meet. One end of the guide rails GR1 and GR2 is adjacent to the bottom surface BS of the joints JM. The guide rails GR1 and GR2 may be adjacent to the display module 100 from one end toward the other end. In the embodiment, the guide rails GR1 and GR2 are parallel to the edge at which the side surfaces FS and SS of the joints JM meet. That is, the guide rails GR1 and GR2 have an inclined shape on a cross-section.

In the embodiment, the guide rails GR1 and GR2 have a shape recessed inwardly from each of the side surfaces FS of the joints JM. The moving pin CP2 may be fastened to the guide rails GR1 and GR2. The moving pin CP2 may be moved along the guide rails GR1 and GR2. That is, according to the embodiment, one end of the outer connection member OCM is fixed to one joint JM by the connection pin CP1, and the other end of the outer connection member OCM may be moved along the guide rails GR1 and GR2 by the movement pin CP2. The inventive concept is not particularly limited to the fastening method of the movement pin CP2 and the guide rails GR1 and GR2.

According to the embodiment, as the display apparatus 1000 operates in the unfolding mode, the first mode and the second mode, the movement pin CP2 may be reciprocally moved on the guide rails GR1 and GR2. That is, as the movement pin CP2 is reciprocally moved on the guide rails GR1 and GR2, the distance between the joints JM may vary.

According to an embodiment of the inventive concept, the outer connection members OCM are divided into first outer connection members OCM1 and second outer connection members OCM2. The first outer connection members OCM1 connect central joints JC adjacent to each other from among the joints JM. The second outer connection members OCM2 connect the edge joints JE and the support plates 210 and 220. In another embodiment of the inventive concept, when a plurality of the edge joints JE are disposed between the central joint JC and the support plates 210 and 220, the second outer connection members OCM2 may connect the edge joints JE adjacent to each other.

In the embodiment, the length of each of the second outer connection members OCM2 may be less than the length of each of the first outer connection members OCM1.

In addition, according to an embodiment of the inventive concept, the guide rails GR1 and GR2 are divided into a first guide rail GR1 and a second guide rail GR2. The first guide rail GR1 is defined on the side surface FS of the central joints JC, and the second guide rail GR2 is defined on the side surface FS of the edge joints JE.

In the embodiment, the length of the second guide rail GR2 is less than the length of the first guide rail GR1. For example, one end of the first guide rail GR1 and one end of the second guide rail GR2 are adjacent to the bottom surface BS of the joints JM. The other end of the first guide rail GR1 is more adjacent (or closer) to the display module 100 (that is, the upper surface US of the joints JM) than the other end of the second guide rail GR2 is to the display module 100.

According to the embodiment, because the length of the second outer connection member OCM2 is less than the length of the first outer connection member OCM1 and the length of the second guide rail GR2 is less than the length of the first guide rail GR1, the maximum value of the separation distance between the edge joints JE and the support plates (first and second plates) 210 and 220 may be less than the maximum value of the separation distance between the central joints JC. That is, the angle range in which the edge joints JE rotate may be less than the angle range in which the central joints JC rotate.

Figure 10:
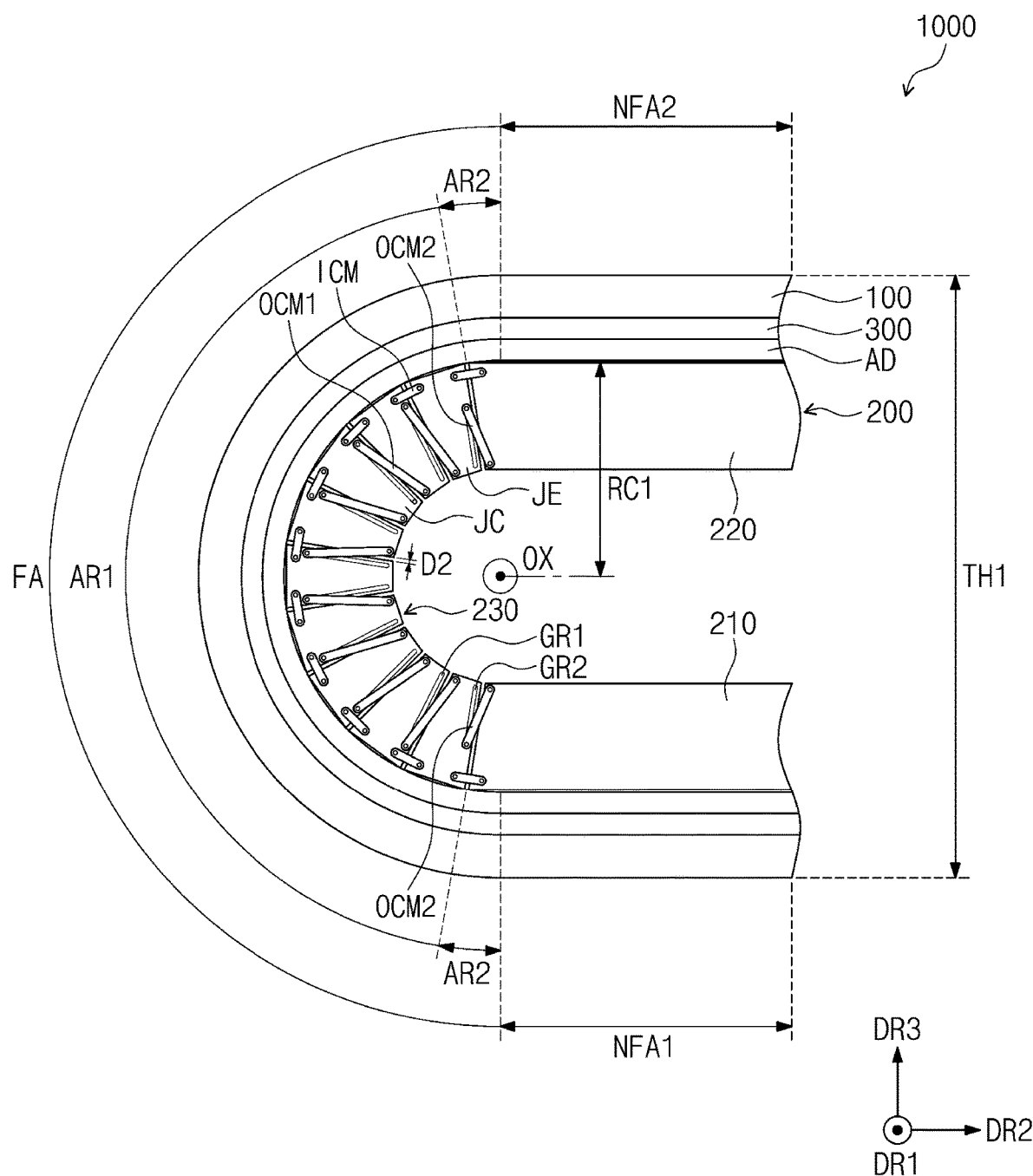
FIG. 10 is a cross-sectional view of an out-folded display apparatus according to an embodiment of the inventive concept.
Figure 11:
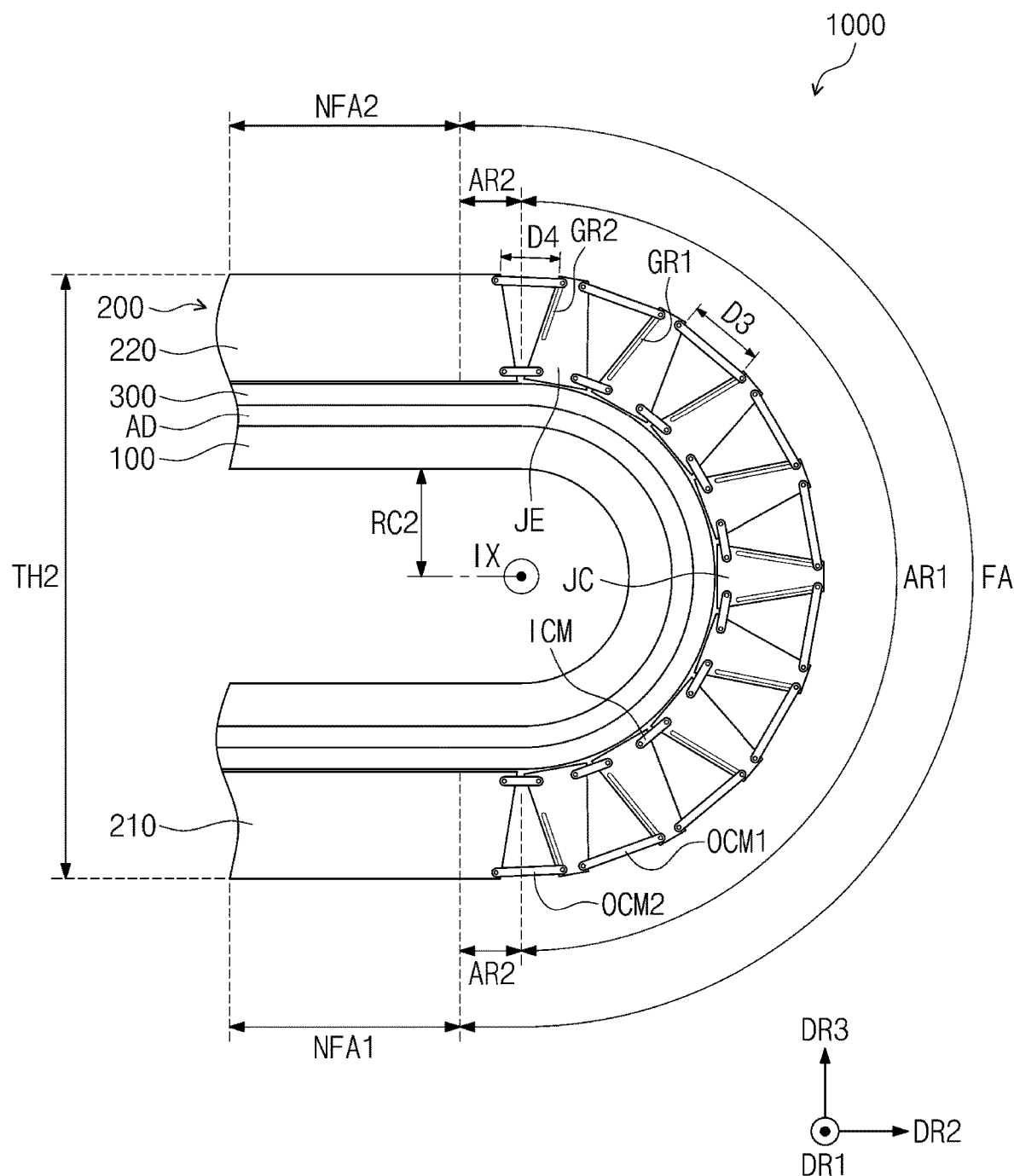
FIG. 11 is a cross-sectional view of an in-folded display apparatus according to an embodiment of the inventive concept.

FIG. 10 is a cross-sectional view of an out-folded display apparatus according to an embodiment of the inventive concept, and FIG. 11 is a cross-sectional view of an in-folded display apparatus according to an embodiment of the inventive concept.

Referring to FIG. 10 and FIG. 5, as described above, when the display apparatus 1000 operates in the first mode, the display apparatus 1000 is folded in a direction surrounding (e.g., around) the first bending axis OX. Here, the display apparatus 1000 is exposed to the outside, and the first plate 210 and the second plate 220 of the support member 200 face each other. The folding region FA of the display module 100 has a first curvature radius (e.g., a first radius of curvature) RC1.

The folding region FA includes a first region AR1 and a second region AR2. The first region AR1 is defined in a central region of the folding region FA. The second region AR2 is defined in a peripheral region of the folding region FA. The second region AR2 is provided in plurality and face each other, and having the first region AR1 interposed therebetween in the second direction DR2. However, the inventive concept is not particularly limited to the number of the second region AR2. In another embodiment of the inventive concept, the second region AR2 may be provided in singularity so that the first region AR1 and the second region AR2 may be arranged side-by-side.

When the display apparatus 1000 operates in the first mode, a region in which the display apparatus 1000 is substantially folded may include the first region AR1 and the second region AR2. The folding region FA has a first area (e.g., a first surface area) on a plane.

In the first mode, the separation distance between the joints JM in the folding unit 230 is decreased (relative to the unfolding mode). That is, when the display apparatus 1000 is out-folded, the distance between the side surfaces SS of the joints JM adjacent to each other may be decreased. In the first mode, the maximum value of the separation distance between the joints JM is defined as a second distance D2. The second distance D2 is less than the first distance D1.

As the separation distance between the joints JM is decreased, one side of each of the outer connection members OCM is fixed in a region adjacent to the bottom surface BS of the joint JM, and the other side is moved on the guide rails GR1 and GR2 in a direction toward the display module 100.

Referring further to FIG. 11, when the display apparatus 1000 operates in the second mode, the display apparatus 1000 is folded in a direction surrounding (e.g., around) the second bending axis IX. Here, the support member 200 is exposed to the outside, and a first display surface corresponding to the first non-folding region NBA1 of regions on the display surface IS (see FIG. 1) of the display module 100 and a second display surface corresponding to the second non-folding region NBA2 face each other. The folding region FA of the display module 100 has a second curvature radius (e.g., a second radius of curvature) RC2.

According to the embodiment, the area of a region in which the display apparatus 1000 is substantially folded in the first mode may be greater than the area of a region in which the display apparatus 1000 is substantially folded in the second mode.

For example, when the display apparatus 1000 operates in the second mode, the region in which the display apparatus 1000 is substantially folded may include only the first region AR1. The second region AR2 has a second area (e.g., a second surface area) on a plane. The second area is less than the first area.

That is, the first region AR1 according to the embodiment is folded in the first bending direction BD1 (see FIG. 2) in the first mode, and folded in the second bending direction BD2 (see FIG. 3) in the second mode. The second region AR2 is folded in the first bending direction BD1 (see FIG. 2) in the first mode, and has a flat-plate shape in the second mode. The second region AR2 is not folded in the second mode.

As described above, because the area in which the display apparatus 1000 is folded is different for each mode, the curvature radii RC1 and RC2 of the display module 100 may be different for each mode. According to the embodiment, the first curvature radius of the display module 100 in the first mode may be greater than the second curvature radius of the display module 100 in the second mode.

In the second mode, the separation distance between the joints JM in the folding unit 230 is increased (relative to the unfolding mode). That is, when the display apparatus 1000 is in-folded, the distance between the side surfaces SS of the joints JM adjacent to each other may be increased. In the second mode, the maximum value of the separation distance between the joints JM is defined as a third distance D3. The third distance D3 is greater than the first distance D1.

As the separation distance between the joints JM is increased, one side of each of the outer connection members OCM is fixed in a region adjacent to the bottom surface BS of the joint JM, and the other side is moved on the guide rails GR1 and GR2 in a direction moving away from the display module 100.

According to an embodiment of the inventive concept, because the length of the second outer connection member OCM2 is less than the length of the first outer connection member OCM1, the maximum separation distance between the edge joints JE and the support plates 210 and 220 may be fixed in the second mode. In the second mode, the maximum value of the separation distance between the edge joints JE and the support plates 210 and 220 is defined as a fourth distance D4. The fourth distance D4 is less than the third distance D3 and greater than or equal to the first distance D1.

That is, the angle range in which the edge joints JE rotate may be less than the angle range in which the central joints JC rotate.

In another embodiment of the inventive concept, at least a portion of the edge joints JE may overlap with the second region AR2, and the edge joints JE overlapping with the second region AR2 are not folded in the second mode.

Unlike embodiments of the inventive concept, when the display module 100 has the same curvature radius in both the first and second modes, the portability of the display apparatus 1000 may be deteriorated due to the difference between an overall thickness TH1 of the display apparatus 1000 in the first mode and an overall thickness TH2 of the display apparatus 1000 in the second mode. However, according to embodiments of the inventive concept, because the display module 100 operates in such a way so as to have different curvature radii RC1 and RC2 in the first mode and the second mode, respectively, the overall thicknesses TH1 and TH2 of the display apparatus 1000 are set to be a constant regardless of the mode. That is, the portability of the display apparatus 1000 may be improved.

In the first mode, the overall thickness TH1 of the display apparatus 1000 is defined as a distance between the first display surface and the second display surface, and in the second mode, the overall thickness TH2 of the display apparatus 1000 is defined as a distance between the bottom surface of the first plate 210 and the bottom surface of the second plate 220.

In addition, according to an embodiment of the inventive concept, because the length of the second outer connection members OCM2 is less than the length of the first outer connection members OCM1, the rotation force of the edge joints JE may be restricted to be less than the rotation force of the central joints JC in the second mode. In the first mode, the rotation force of the edge joints JE may be equal to the rotation force of the central joints JC. That is, according to the embodiment, the support member 200 may fix the display module 100 such that the display module 100 has the first curvature radius RC1 in the first mode and the display module 100 has the second curvature radius RC2 (less than the first curvature radius RC1) in the second mode. That is, the portability of the display apparatus 1000 may be improved.

As an embodiment of the inventive concept, a case in which the overall thicknesses TH1 and TH2 of the display apparatus 1000 is a constant regardless of the mode is described. However, in another embodiment of the inventive concept, the overall thicknesses TH1 and TH2 of the display apparatus 1000 may be different from each other only in a structure in which the display module 100 is fixed such that the display module 100 has different curvature radii RC1 and RC2 for each mode.

As a result, according to an embodiment of the inventive concept, the convenience and portability of the display apparatus 1000 may be improved.

Figure 12:
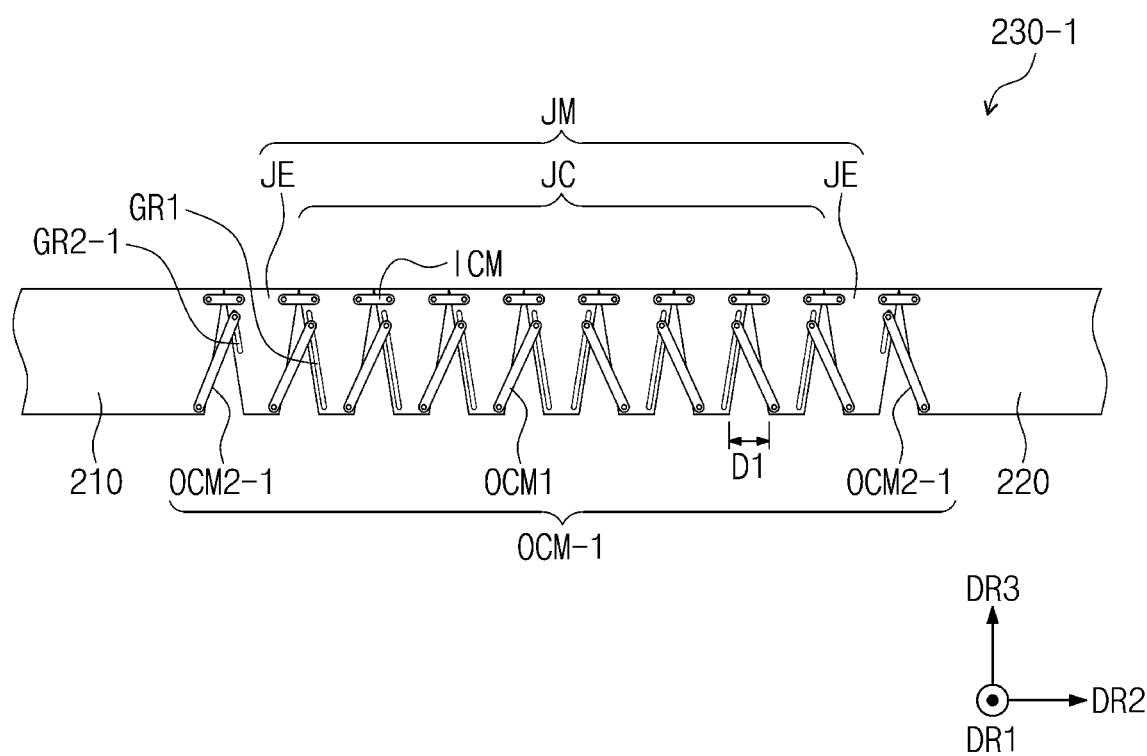
FIG. 12 is an enlarged cross-sectional view of a folding unit according to another embodiment of the inventive concept.
Figure 13:
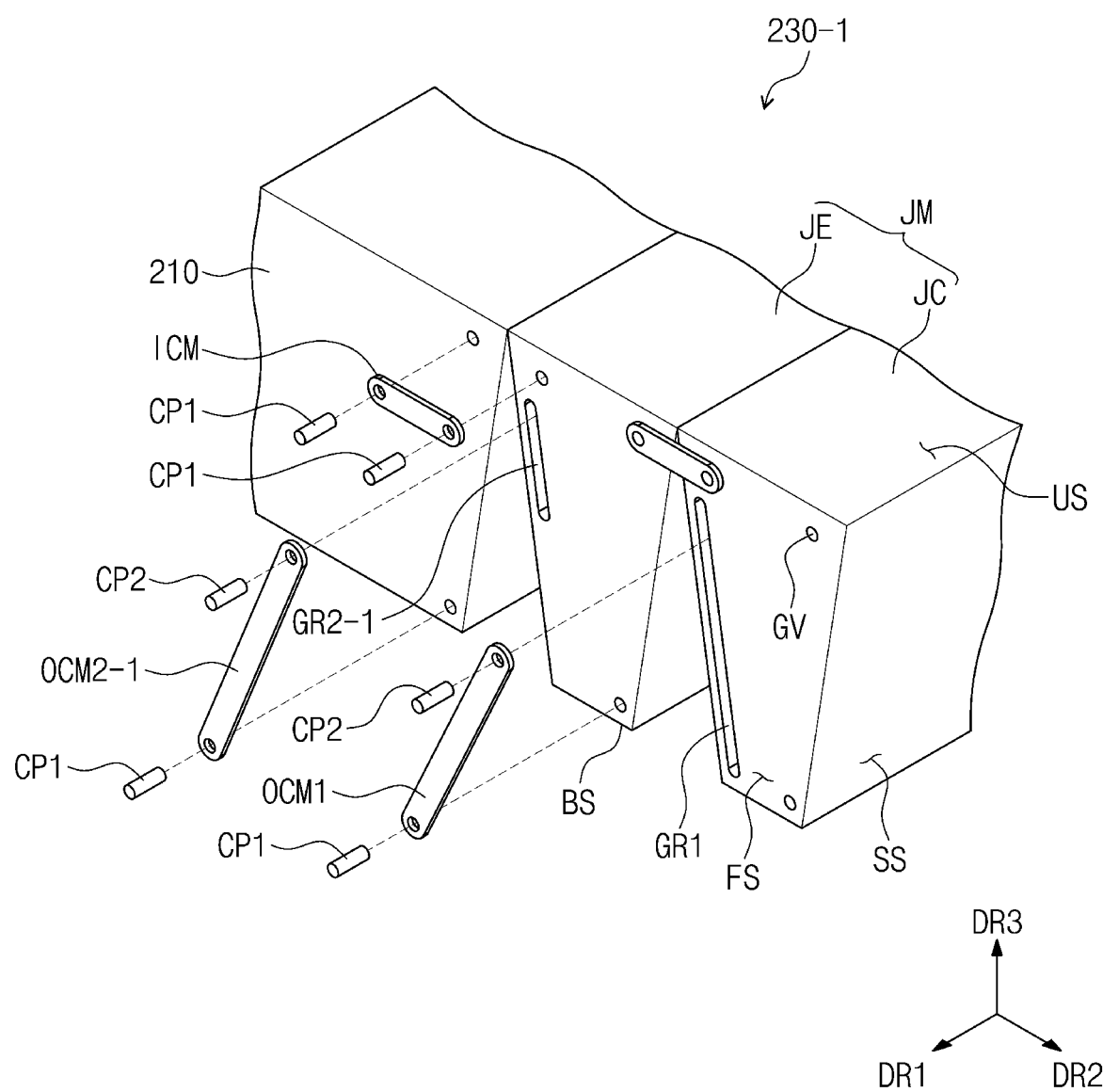
FIG. 13 is an exploded perspective view of the joints and connection members shown in FIG. 12.

FIG. 12 is an enlarged cross-sectional view of the folding unit shown in FIG. 5, and FIG. 13 is an exploded perspective view of the joints and connection members shown in FIG. 12.

Figure 14:
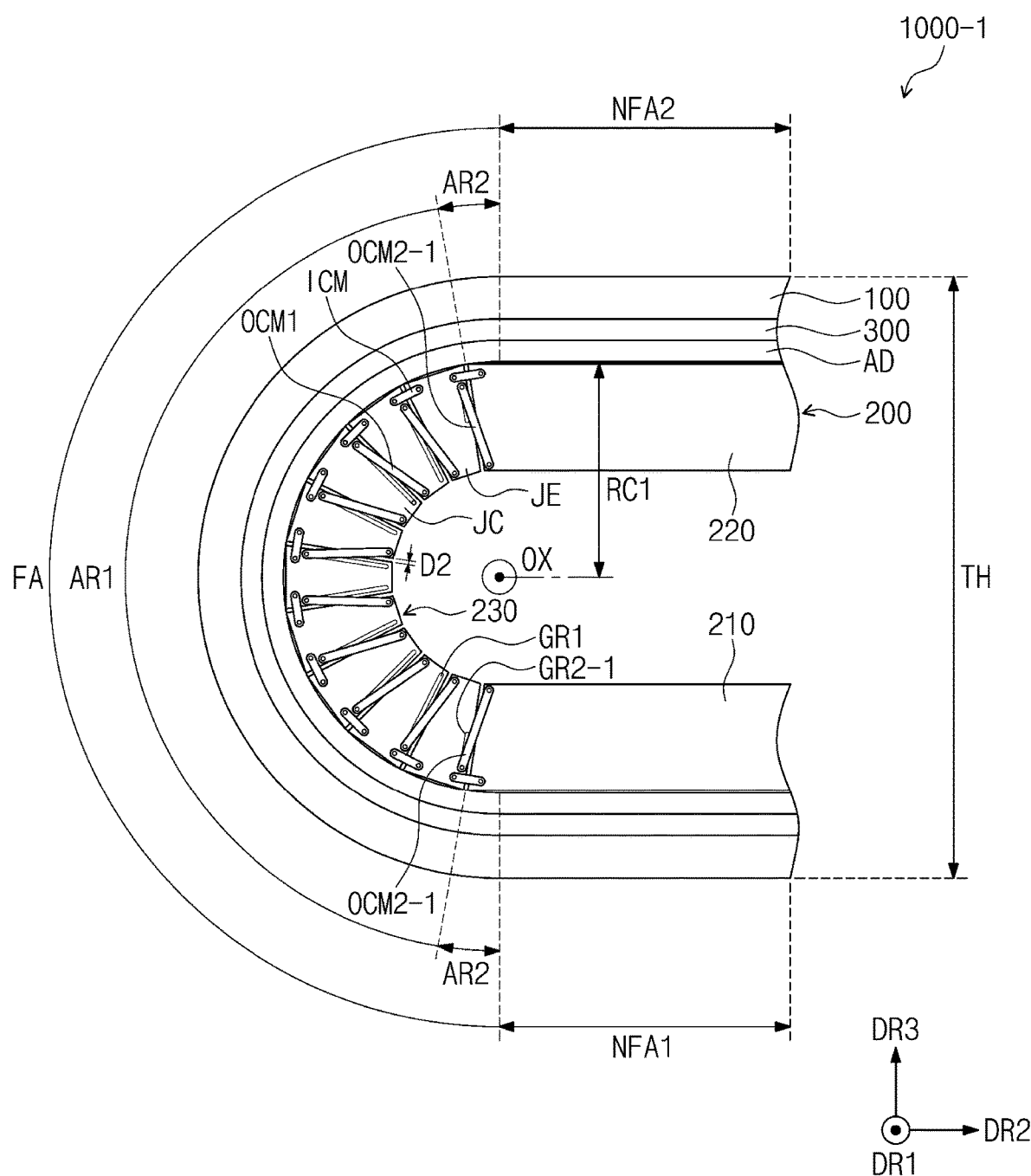
FIG. 14 is a cross-sectional view showing an out-folded state of the folding unit shown in FIG. 12.
Figure 15:
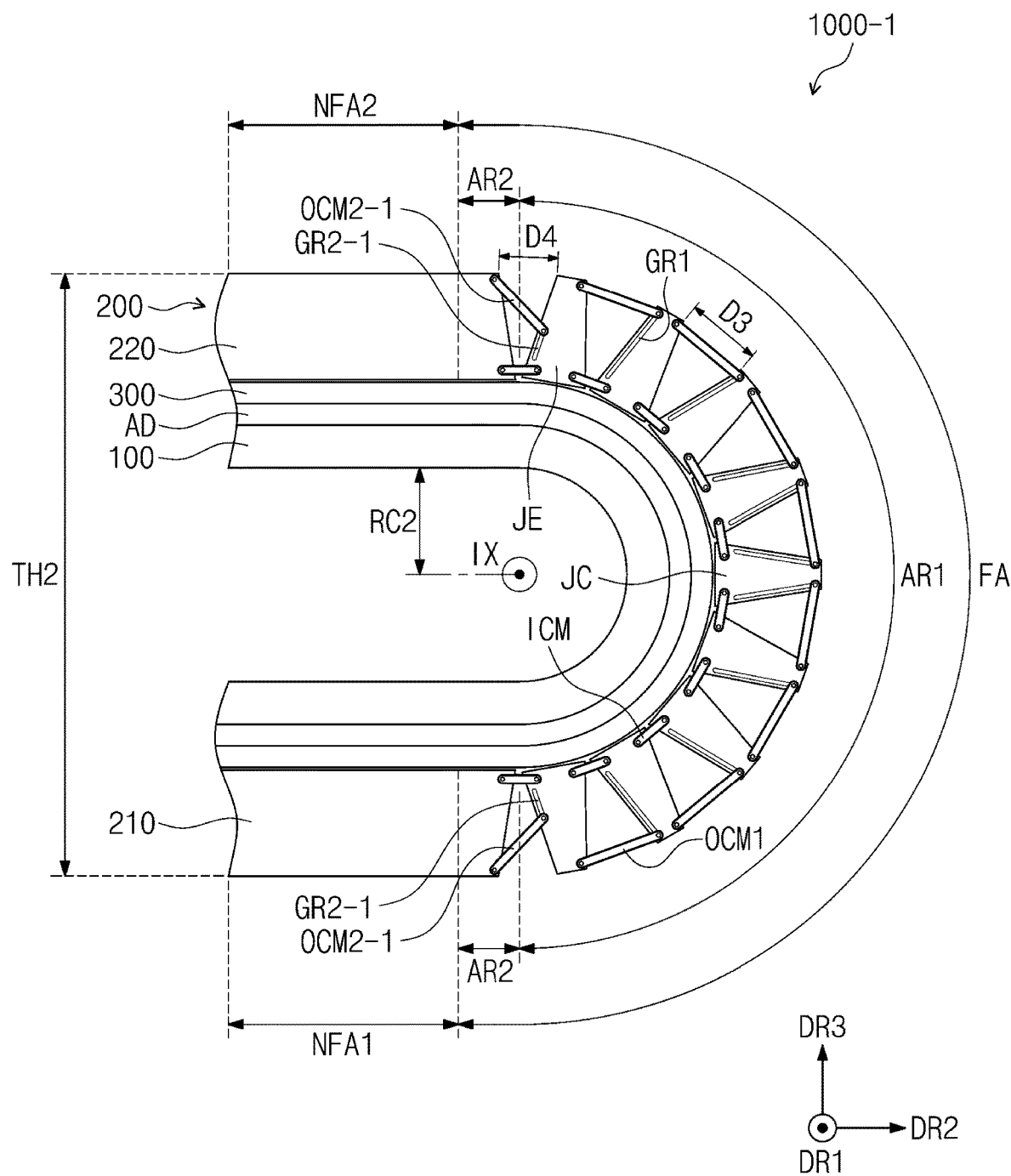
FIG. 15 is a cross-sectional view showing an in-folded state of the folding unit shown in FIG. 12.

FIG. 14 is a cross-sectional view showing an out-folded state of the folding unit shown in FIG. 12, and FIG. 15 is a cross-sectional view showing an in-folded state of the folding unit shown in FIG. 12.

For the convenience of explanation, differences from an embodiment of the inventive concept will be mainly described, and omitted portions are in accordance with an embodiment (e.g., the above described embodiment) of the inventive concept. In addition, the constituent elements described above are denoted by the same reference numerals, and redundant description of the constituent elements is not repeated.

Referring to FIG. 12 to FIG. 15, the length of a second guide rail GR2-1 defined in each of the edge joints JE according to another embodiment of the inventive concept is less than the length of the first guide rail GR1 defined in each of the central joints JC.

According to the embodiment, one end of the first guide rail GR1 is more adjacent (or closer) to the bottom surface BS of the joints JM than one end (e.g., the corresponding end) of the second guide rail GR2 is to the bottom surface BS. That is, the distance between the one end of the first guide rail GR1 and the bottom surface BS of the central joints JC in which the first guide rail GR1 is defined is less than the distance between one end of the second guide rail GR2-1 and the bottom surface BS of the edge joint JE in which the second guide rail GR2-1 is defined.

The distance between the other end of the first guide rail GR1 and the bottom surface BS of the central joints JC in which the first guide rail GR1 is defined is equal to the distance between the other end (e.g., the corresponding other end) of the second guide rail GR2-1 and the bottom surface BS of the edge joint JE in which the second guide rail GR2-1 is defined. In the embodiment, the length of the second outer connection member OCM2-1 may be less than or equal to the length of the first outer connection member OCM1.

According to the embodiment, even when the length of the second outer connection member OCM2-1 is equal to the length of the first outer connection member OCM1, the separation distance between the edge joints JE and the support plates 210 and 220 may be restricted to be less than the separation distance between the central joints JC.

Figure 16:
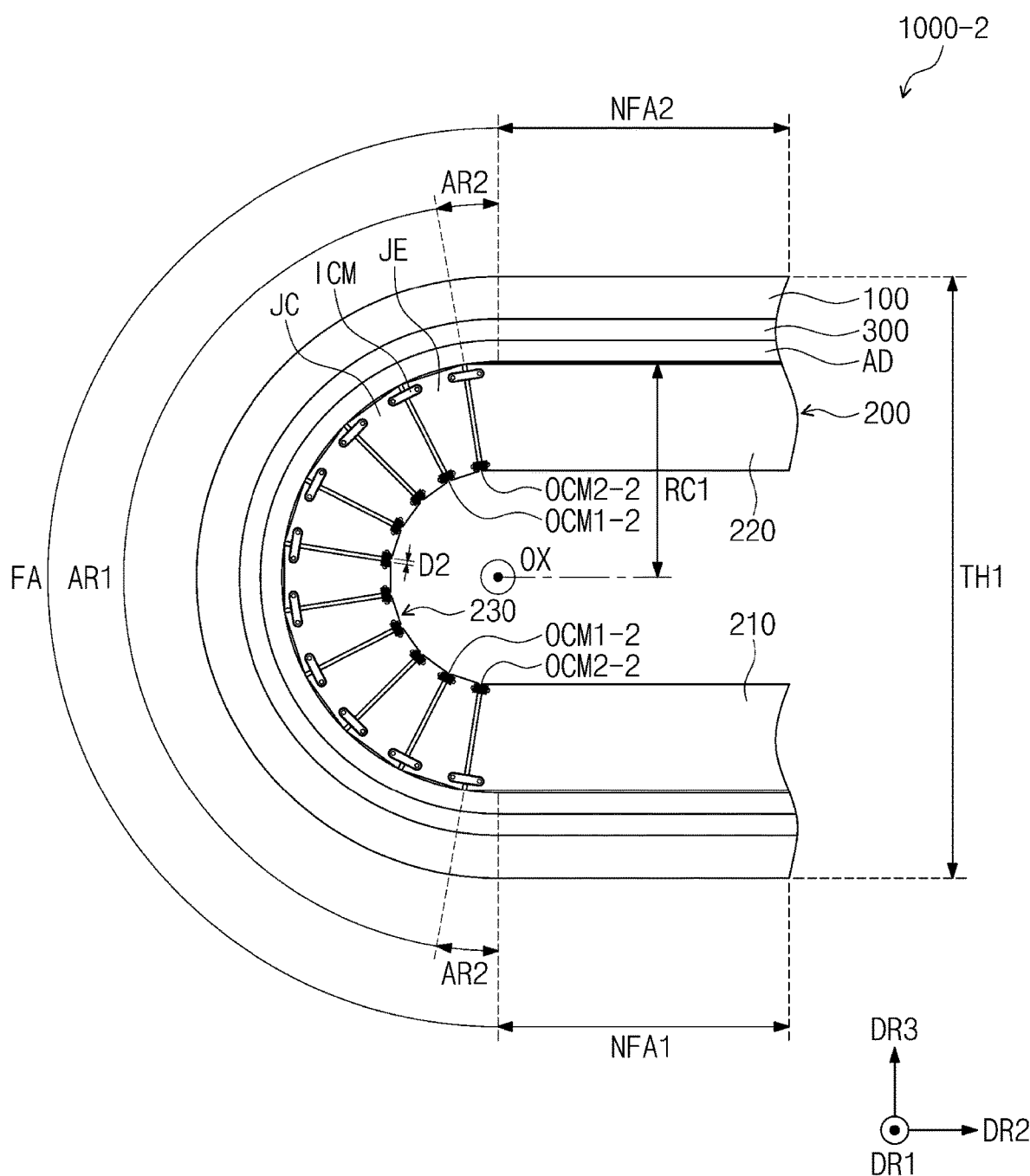
FIG. 16 is a cross-sectional view showing an out-folded state of a display apparatus according to another embodiment of the inventive concept.
Figure 17:
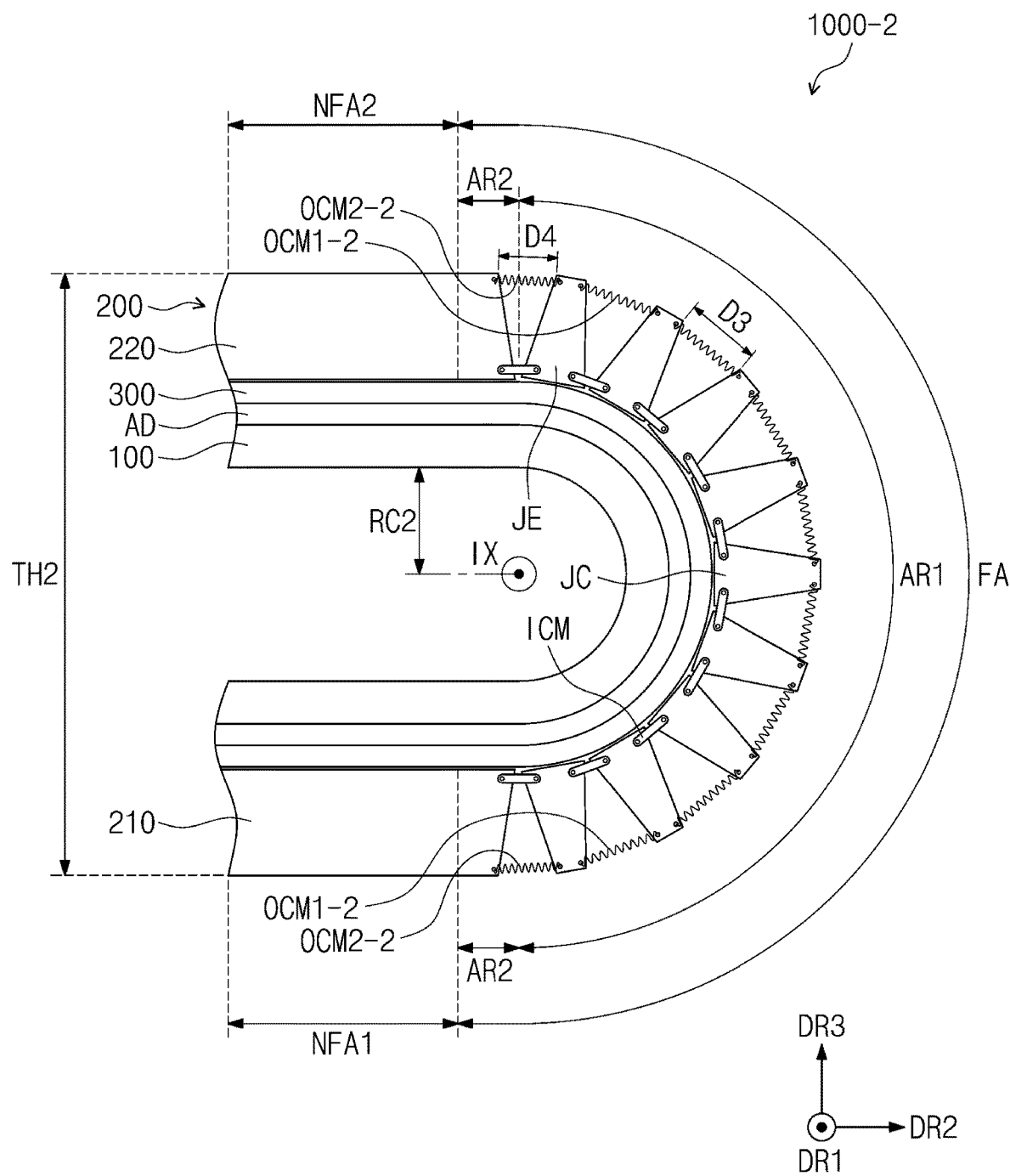
FIG. 17 is a cross-sectional view showing an in-folded state of a display apparatus according to another embodiment of the inventive concept.

FIG. 16 is a cross-sectional view showing an out-folded state of a display apparatus according to another embodiment of the inventive concept, FIG. 17 is a cross-sectional view showing an in-folded state of a display apparatus according to another embodiment of the inventive concept.

For the convenience of explanation, differences from an embodiment of the inventive concept will be mainly described, and omitted portions are in accordance with an embodiment (e.g., the above described embodiment) of the inventive concept. In addition, the constituent elements described above are denoted by the same reference numerals, and redundant description of the constituent elements is not repeated.

Referring to FIG. 16 and FIG. 17, outer connection members OCM1-2 and OCM2-2 of a display apparatus 1000-2 according to another embodiment of the inventive concept may have elasticity. As an example, the outer connection members OCM1-2 and OCM2-2 according to the embodiment may be springs.

Each of the outer connection members OCM1-2 and OCM2-2 is disposed between the joints JC and JE and connects the joints JC and JE adjacent to each other. For example, one end of each of the first outer connection members OCM1-2 may be connected to one of the central joints JC from among the central joints JC adjacent to each other, and the other end of each of the first outer connection members OCM1-2 may be connected to an adjacent central joints JC from among the central joints JC adjacent to each other.

One end of each of the second outer connection members OCM2-2 may be connected to the edge joints JE and the other end of each of the second outer connection members OCM2-2 may be connected to the support plates 210 and 220.

According to an embodiment of the inventive concept, the elastic modulus of the first outer connection member OCM1-2 may be lower than the elastic modulus of the second outer connection member OCM2-2. That is, the extending length of the second outer connection member OCM2-2 may be less than the extending length of the first outer connection member OCM1-2. Accordingly, the separation distance between the edge joints JE and the support plates 210 and 220 may be restricted to be less than the separation distance between the central joints JC.

Figure 18:
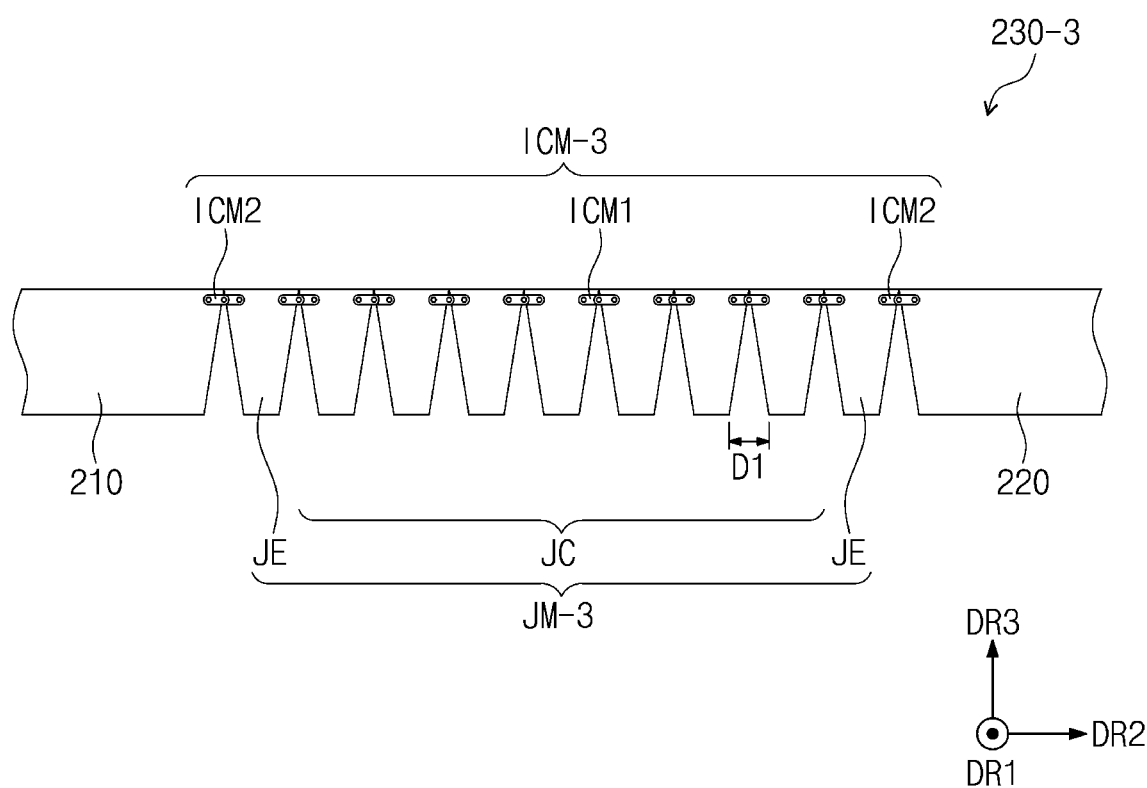
FIG. 18 is an enlarged cross-sectional view of a folding unit according to another embodiment of the inventive concept.
Figure 19:
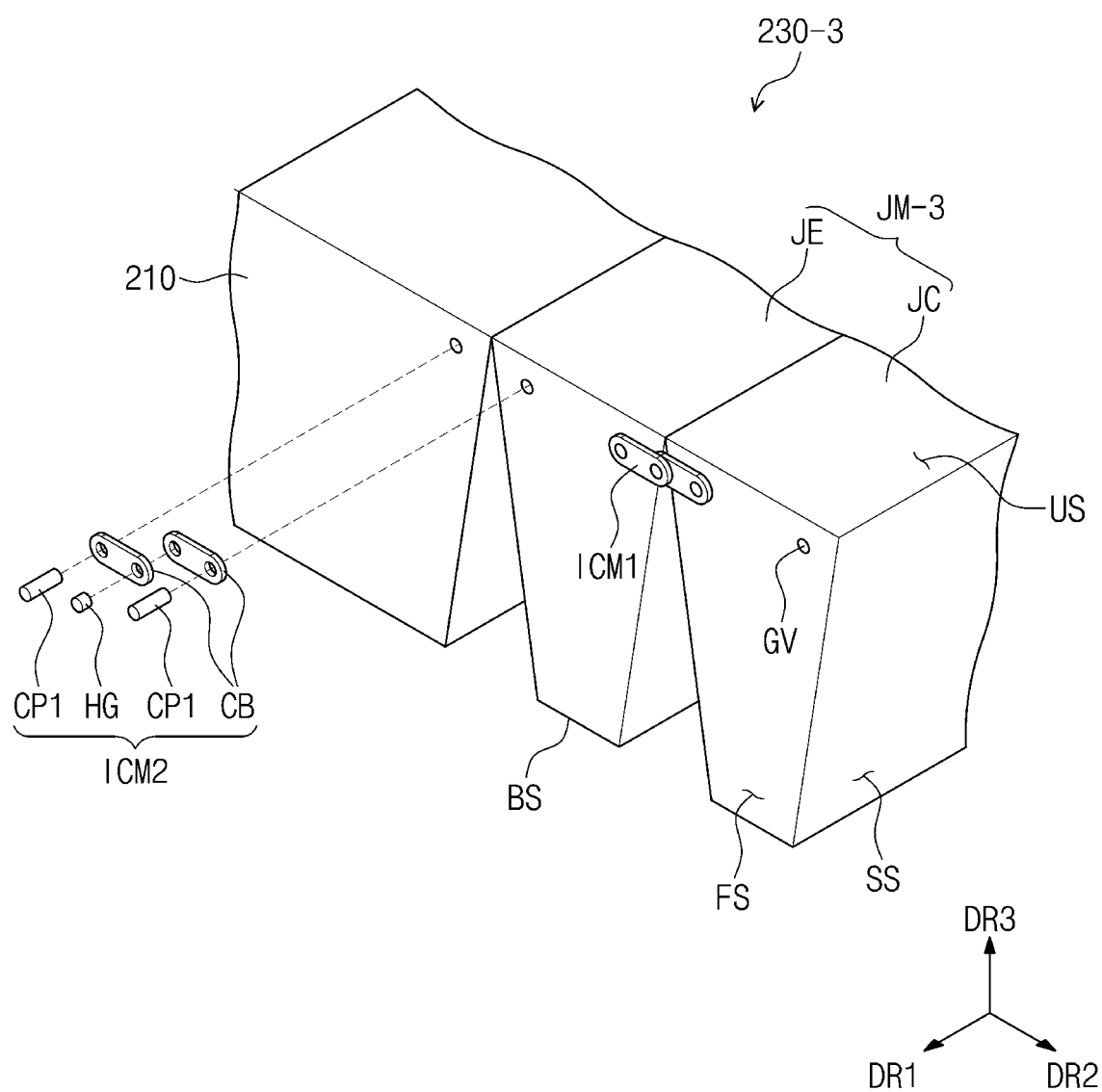
FIG. 19 is an exploded perspective view of the joints and connection members shown in FIG. 18.

FIG. 18 is an enlarged cross-sectional view of the folding unit shown in FIG. 5, and FIG. 19 is an exploded perspective view of the joints and connection members shown in FIG. 18.

Figure 20:
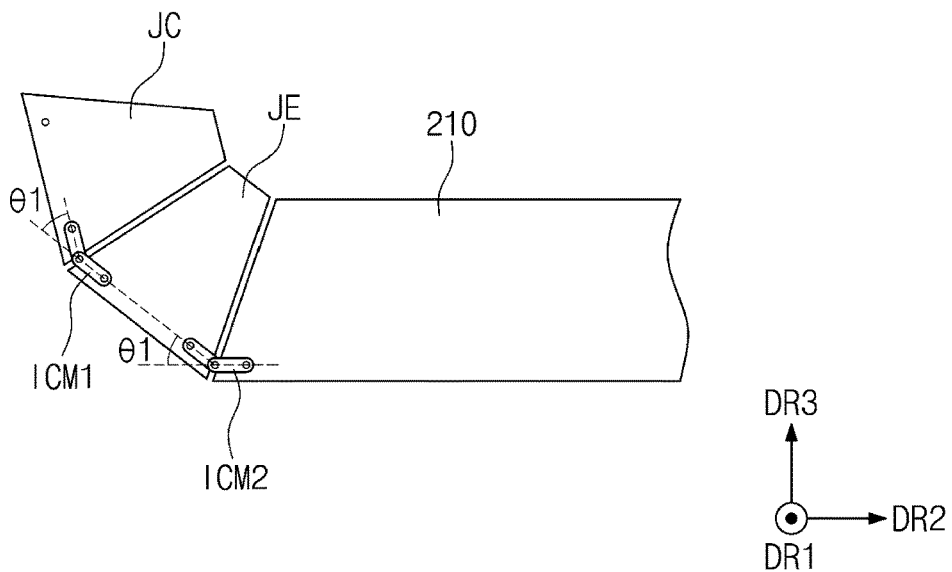
FIG. 20 is a view showing a portion of the folding unit shown in FIG. 18 in an out-folded state.
Figure 21:
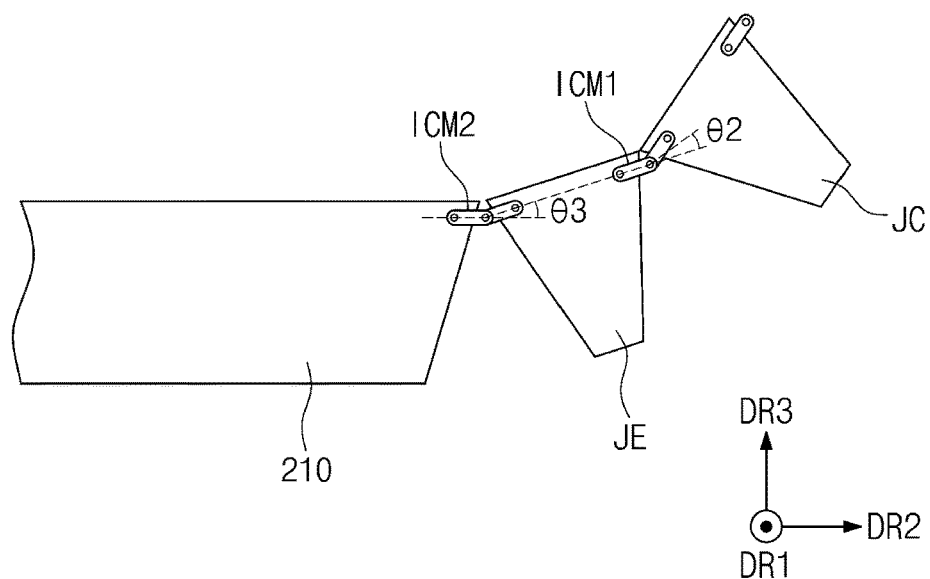
FIG. 21 is a view showing a portion of the folding unit shown in FIG. 18 in an in-folded state.

FIG. 20 is a cross-sectional view showing an out-folded state of the folding unit shown in FIG. 18, and FIG. 21 is a cross-sectional view showing an in-folded state of the folding unit shown in FIG. 18.

For the convenience of explanation, differences from an embodiment of the inventive concept will be mainly described, and omitted portions are in accordance with an embodiment (e.g., the above described embodiment) of the inventive concept. In addition, the constituent elements described above are denoted by the same reference numerals, and redundant description of the constituent elements is not repeated.

Referring to FIG. 18 and FIG. 19, connection members according to another embodiment of the inventive concept only include inner connection members ICM1 and ICM2. In the embodiment, the outer connection members OCM (see FIG. 8) may be omitted (e.g., may not be included).

Each of the inner connection members ICM1 and ICM2 include at least two connection bars CB and a hinge HG. One end of each of the connection bars CB is connected to one of two joints JM-3 adjacent to each other or the support plates 210 and 220 in a one-to-one correspondence. The connection bars CB and the joints JM-3 or the support plates 210 and 220 may be fixed by the connection pin CP1. In the embodiment, the connection bars CB connected to the joints JM-3 and the support plates 210 and 220 are not rotated around the connection pin CP1.

The other end of each of the connection bars CB is connected to the hinge HG. The connection bars CB may rotate around the hinge HG.

The inner connection members ICM1 and ICM2 are divided into first connection member ICM1 and second connection members ICM2. The first inner connection members ICM1 connect central joints JC adjacent to each other from among the joints JM-3. The second inner connection members ICM2 connect the edge joints JE and the support plates 210 and 220. In the embodiment, the length of each of the first inner connection members ICM1 is equal to the length of each of the second inner connection members ICM2.

Referring further to FIG. 18 and FIG. 19, the rotation angle range of the first inner connection member ICM1 and the second inner connection member ICM2 according to the embodiment may be different.

In the first mode, the connection bars CB of each of the first inner connection member ICM1 and the second inner connection member ICM2 have a first angle θ1. For example, in the first mode, two connection bars CB of each of the first inner connection member ICM1 and the second inner connection member ICM2 may rotate to have the first angle θ1 in a positive direction (counterclockwise direction, the first bending direction BD1) on the basis of the connection bar CB disposed relatively farther from the first plate 210.

In the second mode, the connection bars CB of the first inner connection member ICM1 have a second angle θ2. For example, in the second mode, two connection bars CB of the first inner connection member ICM1 may rotate to have the second angle θ2 in a negative direction (clockwise direction, the second bending direction BD2) on the basis of the connection bar CB disposed relatively farther from the first plate 210.

In the second mode, the connection bars CB of the second inner connection member ICM2 have a third angle θ3. For example, in the second mode, two connection bars CB of the second inner connection member ICM2 may rotate to have the third angle θ3 in a negative direction (clockwise direction, the second bending direction BD2) on the basis of the connection bar CB disposed relatively farther from the first plate 210. The third angle θ3 is less than the second angle θ2.

That is, the first inner connection member ICM1 may be rotated by the first angle θ1 in a positive direction in the first mode, and may be rotated by the second angle θ2 in a negative direction in the second mode. The rotation angle range of the first inner connection member ICM1 may be the sum of the first angle θ1 and the second angle θ2.

The second inner connection member ICM2 may be rotated by the first angle θ1 in a positive direction in the first mode, and may be rotated by the third angle θ3 in a negative direction in the second mode. The rotation angle range of the second inner connection member ICM2 may be the sum of the first angle θ1 and the third angle θ3.

As such, by setting the rotation angle range of the second inner connection member ICM2 to be less than the rotation angle range of the first inner connection member ICM1, the separation distance between the edge joints JE and the support plates 210 and 220 may be restricted to be less than the separation distance between the central joints JC.

According to an embodiment of the inventive concept, the convenience and portability of a display apparatus may be increased.

Although the inventive concept has been described with reference to preferred embodiments of the inventive concept, it will be understood by those skilled in the art that various changes in form and details may be made therein without departing from the spirit and scope of the inventive concept. In addition, the embodiments disclosed in the inventive concept are not intended to limit the technical spirit of the inventive concept, and all technical ideas within the scope of the following claims and equivalents thereof should be construed as falling within the scope of the inventive concept.

What is claimed is:

1. A display apparatus comprising:
a display module comprising a folding region and a plurality of non-folding regions adjacent to the folding region, and having a display surface to display an image; and
a support member below the display module to support the display module, wherein
the display module is configured to operate in a plurality of modes, and
the plurality of modes comprises:
an unfolding mode in which an entire display module is unfolded to have a flat-plate shape;
a first mode in which the folding region has a first radius of curvature and is folded in a first bending direction around a first bending axis below the display module; and
a second mode in which the folding region has a second radius of curvature and is folded in a second bending direction around a second bending axis above the display module, wherein
the first bending axis is substantially parallel to the second bending axis,
the first radius of curvature is greater than the second radius of curvature,
wherein the support member comprises a folding unit comprising a plurality of joints, and
the plurality of joints are connected to each other through an inner connection member and an outer connection member spaced apart from the inner connection member.

2. The display apparatus of claim 1, wherein
the folding region comprises:
a first region configured to be folded in the first bending direction in the first mode and to be folded in the second bending direction in the second mode; and
a second region adjacent to the first region, and configured to be folded in the first bending direction in the first mode and to be unfolded to have a flat-plate shape in the second mode.

3. A display apparatus comprising:
a display module comprising a folding region and a plurality of non-folding regions adjacent to the folding region, and having a display surface to display an image; and
a support member below the display module to support the display module, wherein
the display module is configured to operate in a plurality of modes, and
the plurality of modes comprises:
an unfolding mode in which an entire display module is unfolded to have a flat-plate shape;
a first mode in which the folding region has a first radius of curvature and is folded in a first bending direction around a first bending axis below the display module; and
a second mode in which the folding region has a second radius of curvature and is folded in a second bending direction around a second bending axis above the display module, wherein
the first bending axis is substantially parallel to the second bending axis, and
the first radius of curvature is greater than the second radius of curvature,
wherein
the folding region comprises:
a first region configured to be folded in the first bending direction in the first mode and to be folded in the second bending direction in the second mode; and a second region adjacent to the first region, and configured to be folded in the first bending direction in the first mode and to be unfolded to have a flat-plate shape in the second mode, wherein
the first region is at a center of the folding region on a first plane, and
the second region comprises a plurality of second regions and adjacent to both sides of the first region in a first direction.

4. The display apparatus of claim 3, wherein
the support member comprises:
a plurality of support plates overlapping with the non-folding regions on the first plane; and
a folding unit overlapping with the folding region on the first plane and configured to be folded or unfolded according to an operation of the folding region, wherein
the folding unit extends parallel to the first bending axis, and comprises a plurality of joints connected to each other.

5. The display apparatus of claim 4, wherein
the folding unit comprises a first side and a second side facing oppositely away from the first side,
the plurality of joints comprises:
a plurality of central joints connected to each other, the plurality of central joints forming an array, the array comprising a first side and a second side facing oppositely away from the first side; and
a plurality of edge joints on at least the first and second sides of the folding unit and connecting the central joints on the first and second sides of the array to the support plates in a one-to-one correspondence.

6. The display apparatus of claim 5, wherein
one or more of corresponding edge joints of the edge joints are between a corresponding one of the first and second sides of the array of central joints and a corresponding support plate.

7. The display apparatus of claim 5, wherein
an upper surface of each of the plurality of joints define a support surface to support the display module,
an area of the upper surface of each of the plurality of joints is larger than an area of a bottom surface of each of the plurality of joints,
a maximum value of a separation distance between the joints is decreased in the first mode relative to the unfolding mode, and
the maximum value of the separation distance between the joints is increased in the second mode relative to the unfolding mode.

8. The display apparatus of claim 7, wherein
a maximum value of a separation distance between adjacent joints in the first mode is less than the maximum value of the separation distance between adjacent joints in the second mode, and
a maximum distance between the edge joint and the support plate in the second mode is less than a maximum value of a separation distance between adjacent central joints.

9. The display apparatus of claim 7, wherein
a maximum value of a separation distance between adjacent central joints in the unfolding mode has a first distance,
the maximum value of the separation distance between adjacent central joints in the first mode has a second distance smaller than the first distance, and
the maximum value of the separation distance between adjacent central joints in the second mode has a third distance greater than the first distance.

10. The display apparatus of claim 9, wherein
a separation distance between the edge joint and the support plate in the first mode is less than or equal to the first distance, and
the separation distance between the edge joint and the support plate in the second mode is less than the third distance and greater than or equal to the first distance.

11. The display apparatus of claim 7, wherein
the folding unit further comprises a plurality of connection members to connect adjacent joints, and
the plurality of connection members comprises:
inner connection members adjacent to the upper surfaces of the joints and connecting upper portions of adjacent joints; and
outer connection members adjacent to the bottom surfaces of the joints and connecting lower portions of adjacent joints, wherein
the outer connection members comprises:
first outer connection members to connect adjacent central joints; and
second outer connection members to connect the support plates and the edge joints.

12. The display apparatus of claim 11, wherein
a length of each of the second outer connection members is less than a length of each of the first outer connection members.

13. The display apparatus of claim 11, wherein
each of the plurality of joints further comprises a guide rail on at least one surface thereof,
each of the outer connection members comprises a first side and a second side facing oppositely away from the first side, and
the separation distance between the joints is configured to be varied by movement of at least one of the first and second sides of each of the outer connection members along the guide rail.

14. The display apparatus of claim 13, wherein
the guide rail comprises:
first guide rails on the central joints and each of the first guide rails connected to at least one side of the first outer connection member; and
second guide rails on the edge joints and each of the second guide rails connected to at least one side of the second outer connection member, wherein
a length of each of the second guide rails is less than a length of each of the first guide rails.

15. The display apparatus of claim 11, wherein
an elastic modulus of each of the first outer connection members is lower than an elastic modulus of each of the second outer connection members.

16. The display apparatus of claim 15, wherein
each of the outer connection members comprises a spring.

17. The display apparatus of claim 11, wherein
each of the connection members comprises:
a hinge to rotate the joints; and
connection bars to connect the joints to the hinge in a one-to-one correspondence and rotating around the hinge, wherein
an angle range in which the edge joints rotate is less than an angle range in which each of the central joints rotate.

18. The display apparatus of claim 4, wherein
the display surface comprises first and second display surfaces not overlapping with the folding region and separated from each other,
the support plates comprise first and second bottom surfaces facing each other in the second mode, and
a distance between the first and the second display surfaces in the first mode is the same as a distance between the first and second bottom surfaces of the support plates in the second mode.

19. A display apparatus comprising:
a display module to display an image; and
a support member below the display module, wherein
the display module and the support member are configured to be folded in a plurality of modes, and
the plurality of modes comprises:
a first mode in which the display module is folded in a direction around a first bending axis below the display module; and
a second mode in which the display module is folded in a direction around a second bending axis above the display module, wherein
a region in which the display module and the support member are substantially folded has a first area in the first mode and a second area less than the first area in the second mode,
wherein the support member comprises a folding unit comprising a plurality of joints, and
the plurality of joints are connected to each other through an inner connection member and an outer connection member spaced apart from the inner connection member.

* * * * *